United States Patent
Chen

(10) Patent No.: US 9,042,037 B2
(45) Date of Patent: May 26, 2015

(54) IMAGE CAPTURING LENS SYSTEM

(71) Applicant: LARGAN Precision Co., Ltd., Taichung (TW)

(72) Inventor: Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 99 days.

(21) Appl. No.: 13/967,678

(22) Filed: Aug. 15, 2013

(65) Prior Publication Data

US 2015/0009581 A1    Jan. 8, 2015

(30) Foreign Application Priority Data

Jul. 5, 2013  (TW) .............................. 102124263 A

(51) Int. Cl.
  *G02B 3/02* (2006.01)
  *G02B 13/00* (2006.01)

(52) U.S. Cl.
  CPC ................................... *G02B 13/004* (2013.01)

(58) Field of Classification Search
  USPC ......................................................... 359/715
  See application file for complete search history.

(56) References Cited

U.S. PATENT DOCUMENTS

| 2013/0321920 A1 | 12/2013 | Suzuki et al. |
| 2013/0335588 A1* | 12/2013 | Matsusaka et al. ........ 348/220.1 |
| 2014/0036133 A1 | 2/2014 | Sekine et al. |

* cited by examiner

*Primary Examiner* — James Jones
(74) *Attorney, Agent, or Firm* — Tim Tingkang Xia, Esq.; Morris, Manning & Martin, LLP

(57) ABSTRACT

An image capturing lens system includes, in order from an object side to an image side, a first lens element, a second lens element, a third lens element and a fourth lens element. The first lens element with positive refractive power has a convex object-side surface in a paraxial region thereof and a convex image-side surface in a paraxial region thereof. The second lens element has positive refractive power. The third lens element has positive refractive power. The fourth lens element with negative refractive power has a concave image-side surface in a paraxial region thereof, wherein both of an object-side surface and the image-side surface of the fourth lens element are aspheric. The image capturing lens system has a total of four lens elements with refractive power.

19 Claims, 14 Drawing Sheets

IMAGE CAPTURING LENS SYSTEM

RELATED APPLICATIONS

The application claims priority to Taiwan Application Serial Number 102124263, filed Jul. 5, 2013, which is incorporated by reference herein in its entirety.

BACKGROUND

1. Technical Field

The present disclosure relates to an image capturing lens system and image capturing device. More particularly, the present disclosure relates to a compact image capturing lens system and image capturing device.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a three-element lens structure. Due to the popularity of mobile products with high-end specifications, such as smart phones and tablet personal computers, the requirements for high resolution and image quality of present compact optical systems increase significantly. However, the conventional optical systems cannot satisfy these requirements of the compact optical systems.

Other conventional compact optical systems with four-element lens structure enhance image quality and resolution. However, the refractive powers of lens elements are not properly arranged and are thereby not favorable for effectively reducing the total track length. Accordingly, it has limitations in applying to compact electronic products.

SUMMARY

According to one aspect of the present disclosure, an image capturing lens system includes, in order from an object side to an image side, a first lens element, a second lens element, a third lens element and a fourth lens element. The first lens element with positive refractive power has a convex object-side surface in a paraxial region thereof and a convex image-side surface in a paraxial region thereof. The second lens element has positive refractive power. The third lens element has positive refractive power. The fourth lens element with negative refractive power has a concave image-side surface in a paraxial region thereof, wherein both of an object-side surface and the image-side surface of the fourth lens element are aspheric. The image capturing lens system has a total of four lens elements with refractive power. When a focal length of the first lens element is f1, a focal length of the second lens element is f2, a focal length of the third lens element is f3, a central thickness of the first lens element is CT1, a central thickness of the second lens element is CT2, an axial distance between the first lens element and the second lens element is T12, and an axial distance between the second lens element and the third lens element is T23, the following relationships are satisfied:

$0 < f2/f1$;

$0 < f3/f2 < 1.25$; and $0.3 < (T12 + CT2 + T23)/CT1 < 1.9$.

According to another aspect of the present disclosure, an image capturing device, in order from an object side to an image side, includes the image capturing lens system as above-mentioned and an image sensor.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
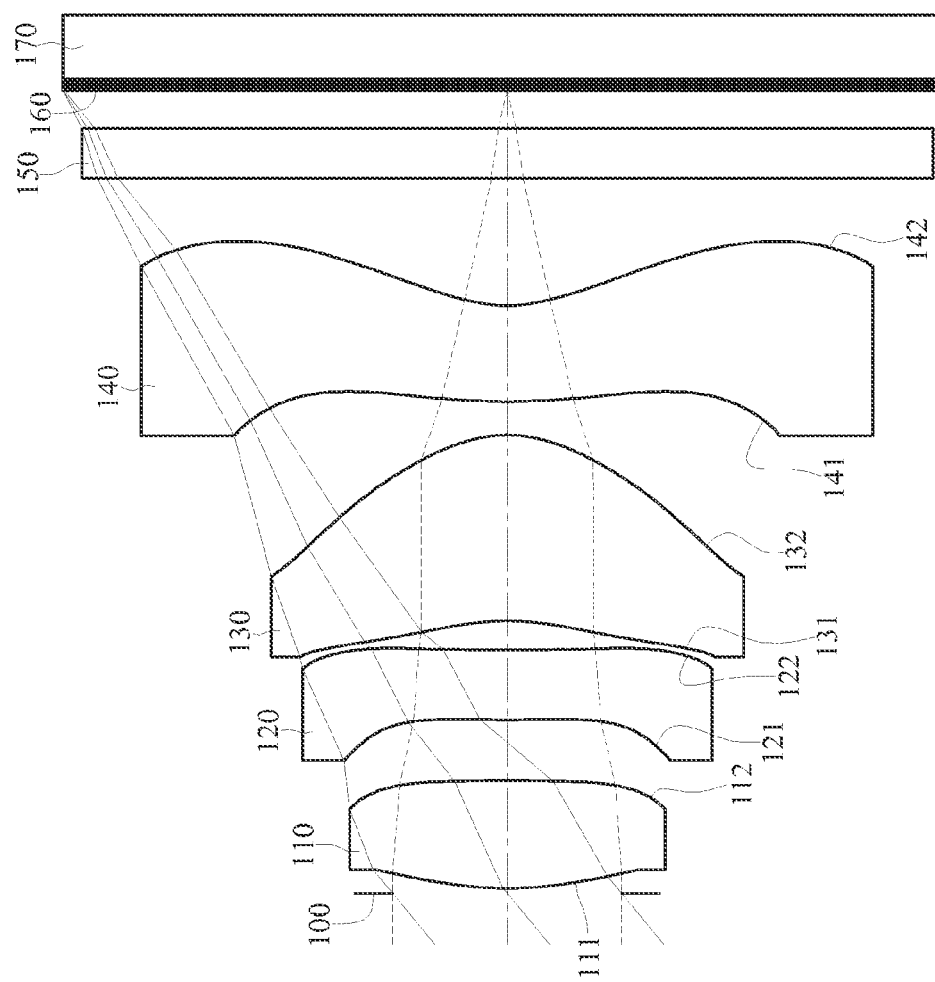
FIG. 1 is a schematic view of an image capturing device according to the 1st embodiment of the present disclosure.

An image capturing lens system includes, in order from an object side to an image side, a first lens element, a second lens element, a third lens element and a fourth lens element. The image capturing lens system has a total of four lens elements with refractive power.

The first lens element has positive refractive power, so that it provides the image capturing lens system with the positive refractive power as it needs to be. Therefore, it is favorable for effectively reducing the total track length of the image capturing lens system. The first lens element has a convex object-side surface in a paraxial region thereof and a convex image-side surface in a paraxial region thereof. Therefore, it is favorable for reinforcing the arrangement of the positive refractive power and effectively reducing the total track length of the image capturing lens system.

The second lens element has positive refractive power, so that it is favorable for reducing the system sensitivity and spherical aberration. The second lens element can have a concave object-side surface in a paraxial region thereof and a convex image-side surface in a paraxial region thereof. Therefore, it is favorable for correcting the astigmatism.

The third lens element has positive refractive power, so that it is favorable for balancing the arrangement of the positive refractive powers. The third lens element can have a concave object-side surface in a paraxial region thereof and a convex image-side surface in a paraxial region thereof. Therefore, it is favorable for effectively correcting the astigmatism. The third lens element can have at least one inflection point on at least one of the object-side surface or the image-side surface thereof. Therefore, it is favorable for reducing the incident angle of the off-axis on the image plane.

The fourth lens element has negative refractive power, so that the principal point of the image capturing lens system can be positioned away from the image plane. Therefore, it is favorable for reducing the total track length so as to keep the image capturing lens system compact. The fourth lens element can have a convex object-side surface in a paraxial region thereof and a concave image-side surface in a paraxial region thereof. Therefore, it is favorable for correcting the aberration. Moreover, the image-side surface of the fourth lens element has at least one inflection point. Therefore, it is favorable for effectively correcting the aberration of the off-axis.

The first lens element, the second lens element, and the third lens element all have positive refractive power, and the fourth lens element has negative refractive power. Therefore, it is favorable for effectively reinforcing the telephoto functionality of the image capturing lens system through this arrangement. Moreover, the image capturing lens system can also have favorably short total track length and short back focal length.

When a focal length of the first lens element is f1, and a focal length of the second lens element is f2, the following relationship is satisfied: $0<f2/f1$. Therefore, it is favorable for reducing the spherical aberration and system sensitivity. Preferably, the following relationship is satisfied: $1.0<f2/f1$.

When the focal length of the second lens element is f2, and a focal length of the third lens element is f3, the following relationship is satisfied: $0<f3/f2<1.25$. Therefore, the positive refractive powers of the second lens element and the third lens element can be more balanced to avoid inequality in refractive powers which might lead to unfavorable focus in an off-axis region. Preferably, the following relationship is satisfied: $0<f3/f2<0.8$.

When a central thickness of the first lens element is CT1, a central thickness of the second lens element is CT2, an axial distance between the first lens element and the second lens element is T12, and an axial distance between the second lens element and the third lens element is T23, the following relationship is satisfied: $0.3<(T12+CT2+T23)/CT1<1.9$. Therefore, it is favorable for reducing the total track length of the image capturing lens system. Preferably, the following relationship is satisfied: $0.5<(T12+CT2+T23)/CT1<1.65$.

When a curvature radius of the object-side surface of the second lens element is R3, and a curvature radius of the image-side surface of the second lens element is R4, the following relationship is satisfied: $|(R3-R4)/(R3+R4)|<1.25$. Therefore, it is favorable for correcting the astigmatism and reducing the spherical aberration of the image capturing lens system. When a central thickness of the fourth lens element is CT4, and an axial distance between the third lens element and the fourth lens element is T34, the following relationship is satisfied: $0.25<T34/CT4<1.0$. Therefore, it is favorable for assembling the lens elements to enhance the manufacturing yield rate.

When a curvature radius of the object-side surface of the first lens element is R1, and a curvature radius of the image-side surface of the first lens element is R2, the following relationship is satisfied: $-1.0<(R1+R2)/(R1-R2)<0.3$. Therefore, it is favorable for reducing the spherical aberration of the image capturing lens system.

When a focal length of the image capturing lens system is f, and the focal length of the first lens element is f1, the following relationship is satisfied: $0.6<f/f1<1.2$. Therefore, it is favorable for balancing the refractive powers of the first lens element and the second lens element so as to effectively control the total track length.

When the focal length of the image capturing lens system is f, and the focal length of the second lens element is f2, the following relationship is satisfied: $0<f/f2<0.5$. Therefore, it is favorable for reducing the sensitivity for the image capturing lens system.

When an Abbe number of the second lens element is V2, the following relationship is satisfied: $V2<32$. Therefore, the chromatic aberration of the image capturing lens system can be corrected.

When the central thickness of the second lens element is CT2, and the axial distance between the first lens element and the second lens element is T12, the following relationship is satisfied: $0.75<T12/CT2<2.5$. Therefore, it is favorable for assembling the lens elements so as to keep the image capturing lens system compact.

When a curvature radius of the object-side surface of the fourth lens element is R7, and a curvature radius of the image-side surface of the fourth lens element is R8, the following relationship is satisfied: $0<(R7+R8)/(R7-R8)$. Therefore, it is favorable for correcting the aberration of the image capturing lens system.

According to the present disclosure, an image capturing device is provided. The image capturing device, in order from an object side to an image side, includes the image capturing lens system according to the aforementioned image capturing lens system of the present disclosure, and an image sensor. Accordingly, it is favorable for effectively reinforcing the telephoto functionality, and obtaining favorably short total track length and short back focal length. In addition, the refractive powers of the second lens element and the third lens element can be more balanced to avoid inequality in refractive powers which might lead to unfavorable focus in an off-axis region through a proper arrangement of the refractive powers of the second lens element and the third lens element.

According to the image capturing lens system of the present disclosure, the lens elements can be made of plastic or glass material. When the lens elements are made of glass material, the distribution of the refractive power of the image capturing lens system can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the image capturing lens system can be effectively reduced.

According to the image capturing lens system of the present disclosure, when the lens element has a convex surface, it indicates that the surface is convex in the paraxial region thereof; and when the lens element has a concave surface, it indicates that the surface is concave in the paraxial region thereof. Particularly, the paraxial region thereof refers to the region of the surface where light rays travel close to an optical axis and an off-axis region thereof refers to the region of the surface where light rays travel away from the optical axis.

According to the image capturing lens system of the present disclosure, the image capturing lens system can include at least one stop, such as an aperture stop, a glare stop or a field stop. Said glare stop or said field stop can be disposed in front of the first lens element, between lens elements or after the last lens element for eliminating the stray light and thereby improving the image resolution thereof.

According to the image capturing lens system of the present disclosure, an aperture stop can be configured as a front stop or a middle stop. A front stop disposed between an imaged object and the first lens element can provide a longer distance between an exit pupil of the system and an image plane to make the image capturing lens system have a telecentric effect and is favorable for improving the image-sensing efficiency of the image sensor. A middle stop disposed between the first lens element and the image plane is favorable for enlarging the field of view of the image capturing lens system and thereby provides a wider field of view for the same.

According to the image capturing lens system of the present disclosure, the image capturing lens system is featured with good correction ability and high image quality, and can be applied to 3D (three-dimensional) image capturing applications, in products such as digital cameras, mobile devices and tablets.

According to the above description of the present disclosure, the following 1st-7th specific embodiments are provided for further explanation.

1st Embodiment

Figure 2:
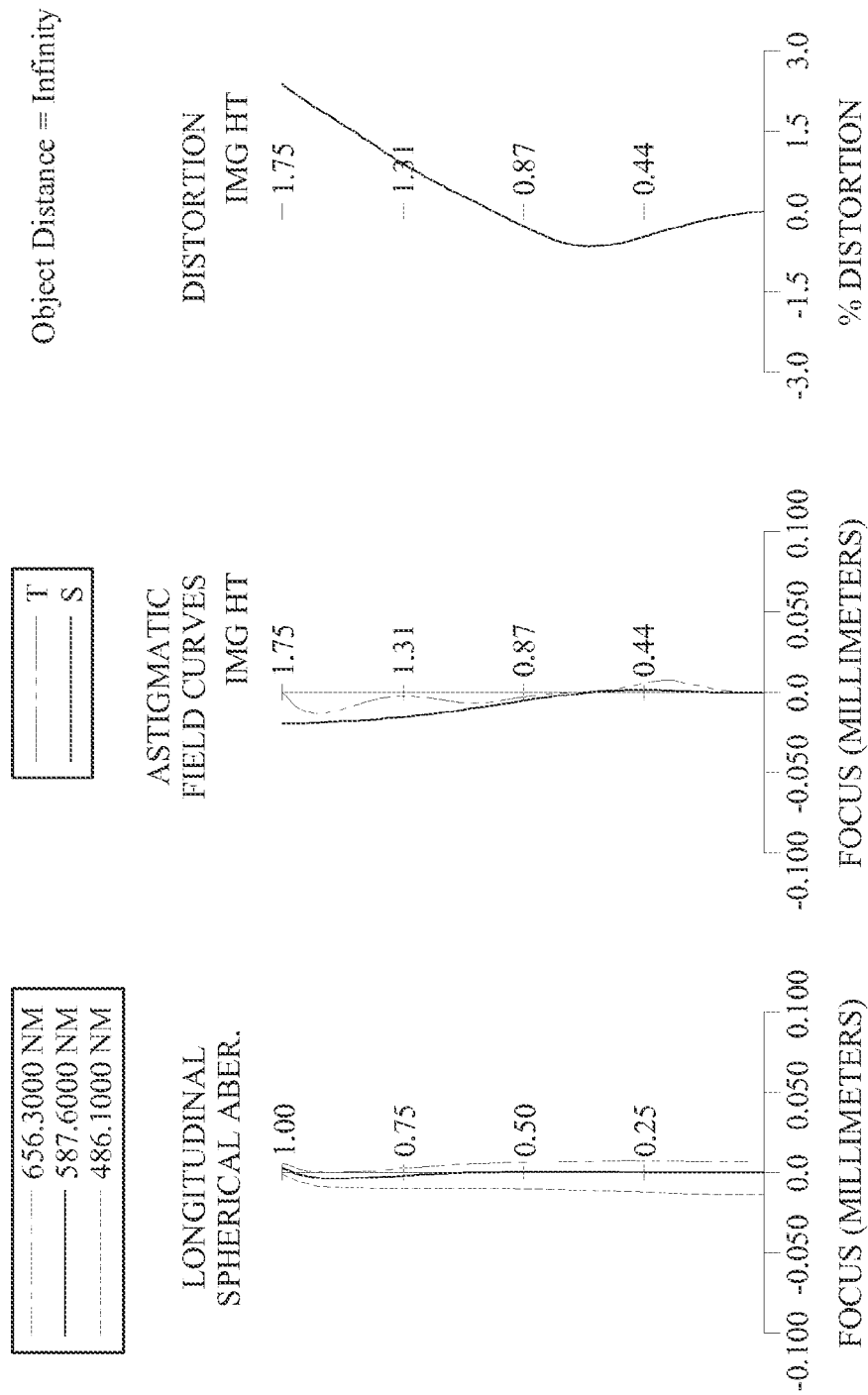
FIG. 2 shows spherical aberration curves, astigmatic field curves and a distortion curve of the image capturing lens system according to the 1st embodiment.

FIG. 1 is a schematic view of an image capturing device according to the 1st embodiment of the present disclosure. FIG. 2 shows spherical aberration curves, astigmatic field curves and a distortion curve of the image capturing lens system according to the 1st embodiment. In FIG. 1, an image capturing device includes, in order from an object side to an image side, an image capturing lens system and an image sensor 170, the image capturing lens system includes, in order from an object side to an image side, an aperture stop 100, a first lens element 110, a second lens element 120, a third lens element 130, a fourth lens element 140, an IR-cut filter 150 and an image plane 160, wherein the image sensor 170 is located on the image plane 160 of the image capturing lens system, and the image capturing lens system has a total of four lens elements (110-140) with refractive power.

The first lens element 110 with positive refractive power has a convex object-side surface 111 in a paraxial region thereof and a convex image-side surface 112 in a paraxial region thereof. The first lens element 110 is made of plastic material and the object-side surface 111 and the image-side surface 112 thereof are aspheric.

The second lens element 120 with positive refractive power has a convex object-side surface 121 in a paraxial region thereof and a convex image-side surface 122 in a paraxial region thereof. The second lens element 120 is made of plastic material and the object-side surface 121 and the image-side surface 122 thereof are aspheric.

The third lens element 130 with positive refractive power has a concave object-side surface 131 in a paraxial region thereof and a convex image-side surface 132 in a paraxial region thereof. The third lens element 130 is made of plastic material and the object-side surface 131 and the image-side surface 132 thereof are aspheric. Moreover, both of the object-side surface 131 and the image-side surface 132 of the third lens element 130 have at least one inflection point.

The fourth lens element 140 with negative refractive power has a convex object-side surface 141 in a paraxial region thereof and a concave image-side surface 142 in a paraxial region thereof. The fourth lens element 140 is made of plastic material and the object-side surface 141 and the image-side surface 142 thereof are aspheric. Moreover, the image-side surface 142 of the fourth lens element 140 has at least one inflection point.

The IR-cut filter 150 is made of glass material, wherein the IR-cut filter 150 is located between the fourth lens element 140 and the image plane 160, and will not affect the focal length of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the image capturing lens system according to the 1st embodiment, when a focal length of the image capturing lens system is f, an f-number of the image capturing lens system is Fno, and half of the maximal field of view of the image capturing lens system is HFOV, these parameters have the following values: f=2.08 mm; Fno=2.30; and HFOV=39.5 degrees.

In the image capturing lens system according to the 1st embodiment, when an Abbe number of the second lens element 120 is V2, the following relationship is satisfied: V2=23.4.

In the image capturing lens system according to the 1st embodiment, when the focal length of the image capturing lens system is f, and a focal length of the first lens element 110 is f1, the following relationship is satisfied: f/f1=0.72.

In the image capturing lens system according to the 1st embodiment, when the focal length of the image capturing lens system is f, and a focal length of the second lens element 120 is f2, the following relationship is satisfied: f/f2=0.16.

In the image capturing lens system according to the 1st embodiment, when the focal length of the first lens element 110 is f1, and the focal length of the second lens element 120 is f2, the following relationship is satisfied: f2/f1=4.63.

In the image capturing lens system according to the 1st embodiment, when the focal length of the second lens element 120 is f2, and a focal length of the third lens element 130 is f3, the following relationship is satisfied: f3/f2=0.09.

In the image capturing lens system according to the 1st embodiment, when a central thickness of the second lens element 120 is CT2, and an axial distance between the first lens element 110 and the second lens element 120 is T12, the following relationship is satisfied: T12/CT2=0.88.

In the image capturing lens system according to the 1st embodiment, when a central thickness of the first lens element 110 is CT1, the central thickness of the second lens element 120 is CT2, the axial distance between the first lens element 110 and the second lens element 120 is T12, and an axial distance between the second lens element 120 and the third lens element 130 is T23, the following relationship is satisfied: (T12+CT2+T23)/CT1=1.49.

In the image capturing lens system according to the 1st embodiment, when a central thickness of the fourth lens element 140 is CT4, and an axial distance between the third lens element 130 and the fourth lens element 140 is T34, the following relationship is satisfied: T34/CT4=0.35.

In the image capturing lens system according to the 1st embodiment, when a curvature radius of the object-side surface 121 of the second lens element 120 is R3, and a curvature radius of the image-side surface 122 of the second lens element 120 is R4, the following relationship is satisfied: |(R3−R4)/(R3+R4)|=1.20.

In the image capturing lens system according to the 1st embodiment, when a curvature radius of the object-side surface 111 of the first lens element 110 is R1, and a curvature radius of the image-side surface 112 of the first lens element 110 is R2, the following relationship is satisfied: (R1+R2)/(R1−R2)=−0.97.

In the image capturing lens system according to the 1st embodiment, when a curvature radius of the object-side surface 141 of the fourth lens element 140 is R7, and a curvature radius of the image-side surface 142 of the fourth lens element 140 is R8, the following relationship is satisfied: (R7+R8)/(R7−R8)=1.51.

The detailed optical data of the 1st embodiment are shown in Table 1 and the aspheric surface data are shown in Table 2 below.

TABLE 1

1st Embodiment
f = 2.08 mm, Fno = 2.30, HFOV = 39.5 deg.

| Surface # |           | Curvature Radius |     | Thickness | Material | Index | Abbe # | Focal Length |
|-----------|-----------|------------------|-----|-----------|----------|-------|--------|--------------|
| 0         | Object    | Plano            |     | Infinity  |          |       |        |              |
| 1         | Ape. Stop | Plano            |     | 0.021     |          |       |        |              |
| 2         | Lens 1    | 1.560            | ASP | 0.423     | Plastic  | 1.535 | 55.7   | 2.88         |
| 3         |           | −100.000         | ASP | 0.242     |          |       |        |              |
| 4         | Lens 2    | 9.197            | ASP | 0.276     | Plastic  | 1.633 | 23.4   | 13.32        |
| 5         |           | −100.000         | ASP | 0.113     |          |       |        |              |
| 6         | Lens 3    | −1.025           | ASP | 0.735     | Plastic  | 1.535 | 55.7   | 1.24         |
| 7         |           | −0.503           | ASP | 0.132     |          |       |        |              |
| 8         | Lens 4    | 2.874            | ASP | 0.379     | Plastic  | 1.650 | 21.4   | −1.20        |
| 9         |           | 0.583            | ASP | 0.500     |          |       |        |              |
| 10        | IR-cut filter | Plano        |     | 0.200     | Glass    | 1.517 | 64.2   | —            |
| 11        |           | Plano            |     | 0.151     |          |       |        |              |
| 12        | Image     | Plano            |     | —         |          |       |        |              |

Note:
Reference wavelength is 587.6 nm (d-line).

TABLE 2

Aspheric Coefficients

| Surface # | 2 | 3 | 4 | 5 |
|-----------|---|---|---|---|
| k =   | −4.0886E+00 | 9.9000E+01  | −9.9000E+01 | 9.9000E+01  |
| A4 =  | 2.7641E−02  | −4.0065E−01 | −4.7800E−01 | 5.1143E−01  |
| A6 =  | −2.4589E−01 | −5.3267E−01 | −1.8365E+00 | −2.2307E+00 |
| A8 =  | −5.4222E−01 | −3.0924E−01 | −1.1381E+00 | 2.3349E+00  |
| A10 = | 6.5497E−01  | −1.9789E−01 | 7.5391E+00  | 2.0711E−01  |
| A12 = | −3.6288E+00 | −5.5764E−01 | −7.1168E+00 | −1.2892E+00 |
| A14 = | −3.6273E+00 | −2.3439E+00 | 7.5180E−01  | −3.6737E−01 |
| A16 = | −4.8162E+01 | −1.0299E+01 | 7.3993E+00  | 1.7809E−02  |

| Surface # | 6 | 7 | 8 | 9 |
|-----------|---|---|---|---|
| k =   | −1.5651E+00 | −2.6807E+00 | −1.7745E+01 | −5.5301E+00 |
| A4 =  | 9.9174E−01  | −9.0714E−02 | 7.4946E−02  | −1.0551E−01 |
| A6 =  | −9.3559E−01 | −3.9532E−01 | −8.3290E−01 | −6.0013E−02 |
| A8 =  | −1.4095E+00 | 4.9171E−01  | 1.1468E+00  | 1.2154E−01  |
| A10 = | 3.7084E+00  | −1.1429E−01 | −8.5080E−01 | −9.3674E−02 |
| A12 = | −2.1111E+00 | 6.9326E−02  | 3.4089E−01  | 3.9409E−02  |
| A14 = | −2.8530E−01 | −3.0348E−02 | −7.7688E−02 | −9.3204E−03 |
| A16 = | −2.8626E−01 | 2.4055E−02  | 5.8719E−03  | 9.7139E−04  |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. This information related to Table 1 and Table 2 applies also to the Tables for the remaining embodiments, and so an explanation in this regard will not be provided again.

2nd Embodiment

Figure 3:
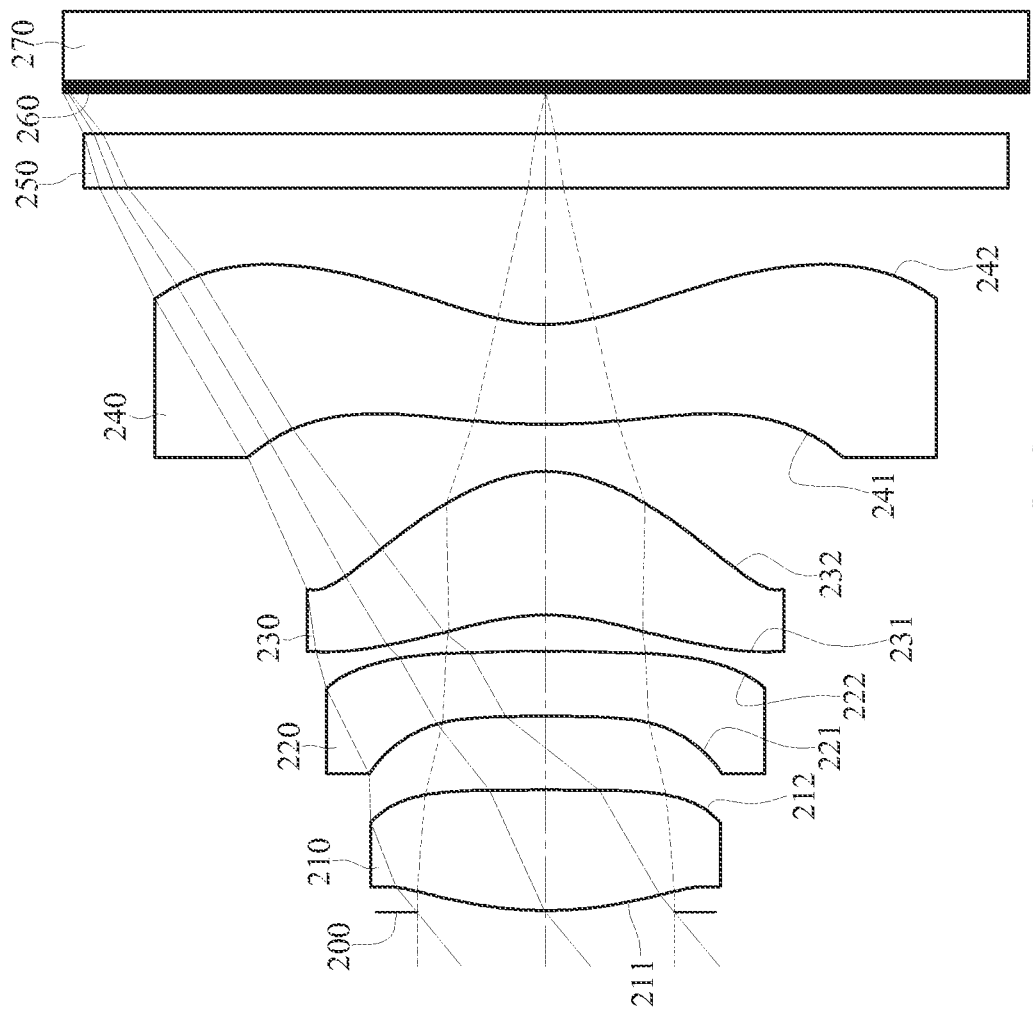
FIG. 3 is a schematic view of an image capturing device according to the 2nd embodiment of the present disclosure.
Figure 4:
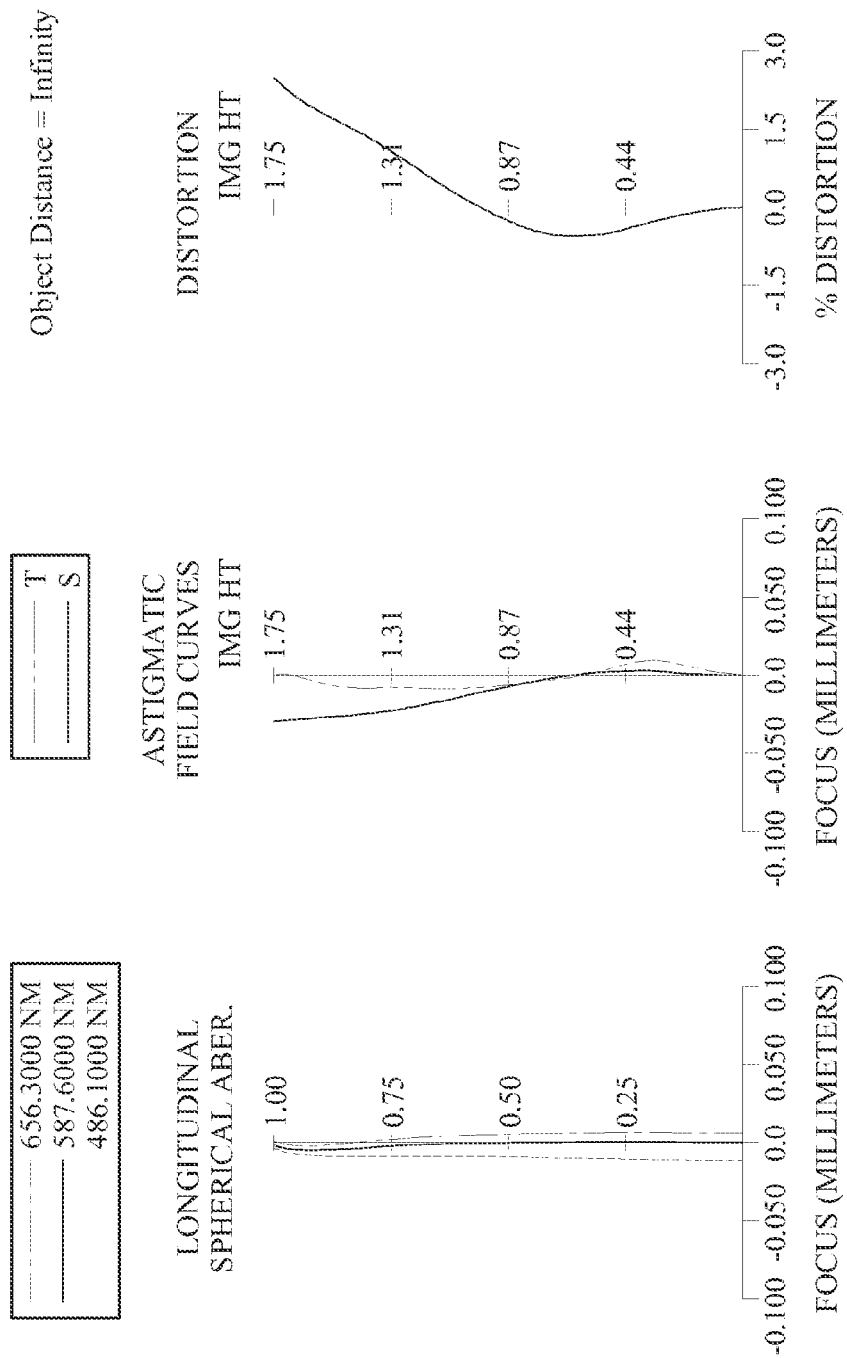
FIG. 4 shows spherical aberration curves, astigmatic field curves and a distortion curve of the image capturing lens system according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing lens system according to the 2nd embodiment. In FIG. 3, an image capturing device includes, in order from an object side to an image side, an image capturing lens system and an image sensor 270, the image capturing lens system includes, in order from an object side to an image side, an aperture stop 200, a first lens element 210, a second lens element 220, a third lens element 230, a fourth lens element 240, an IR-cut filter 250 and an image plane 260, wherein the image sensor 270 is located on the image plane 260 of the image capturing lens system, and the image capturing lens system has a total of four lens elements (210-240) with refractive power.

The first lens element 210 with positive refractive power has a convex object-side surface 211 in a paraxial region thereof and a convex image-side surface 212 in a paraxial region thereof. The first lens element 210 is made of glass material and the object-side surface 211 and the image-side surface 212 thereof are aspheric.

The second lens element 220 with positive refractive power has a concave object-side surface 221 in a paraxial region thereof and a convex image-side surface 222 in a paraxial region thereof. The second lens element 220 is made of plastic material and the object-side surface 221 and the image-side surface 222 thereof are aspheric.

The third lens element 230 with positive refractive power has a concave object-side surface 231 in a paraxial region thereof and a convex image-side surface 232 in a paraxial region thereof. The third lens element 230 is made of plastic material and the object-side surface 231 and the image-side surface 232 thereof are aspheric. Moreover, both of the object-side surface 231 and the image-side surface 232 of the third lens element 230 have at least one inflection point.

The fourth lens element 240 with negative refractive power has a convex object-side surface 241 in a paraxial region thereof and a concave image-side surface 242 in a paraxial region thereof. The fourth lens element 240 is made of plastic material and the object-side surface 241 and the image-side surface 242 thereof are aspheric. Moreover, the image-side surface 242 of the fourth lens element 240 has at least one inflection point.

The IR-cut filter 250 is made of glass material, wherein the IR-cut filter 250 is located between the fourth lens element 240 and the image plane 260, and will not affect the focal length of the image capturing lens system.

The detailed optical data of the 2nd embodiment are shown in Table 3 and the aspheric surface data are shown in Table 4 below.

TABLE 3

2nd Embodiment
f = 2.07 mm, Fno = 2.20, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.007 | | | | |
| 2 | Lens 1 | 1.459 | ASP | 0.442 | Glass | 1.542 | 62.9 | 2.64 |
| 3 | | −76.035 | ASP | 0.270 | | | | |
| 4 | Lens 2 | −10.000 | ASP | 0.239 | Plastic | 1.633 | 23.4 | 19.78 |
| 5 | | −5.610 | ASP | 0.132 | | | | |
| 6 | Lens 3 | −0.842 | ASP | 0.527 | Plastic | 1.535 | 55.7 | 1.46 |
| 7 | | −0.494 | ASP | 0.173 | | | | |
| 8 | Lens 4 | 2.698 | ASP | 0.366 | Plastic | 1.650 | 21.4 | −1.38 |
| 9 | | 0.638 | ASP | 0.500 | | | | |
| 10 | IR-cut filter | Plano | | 0.200 | Glass | 1.517 | 64.2 | — |
| 11 | | Plano | | 0.151 | | | | |
| 12 | Image | Plano | | — | | | | |

Note:
Reference wavelength is 587.6 nm (d-line).

TABLE 4

Aspheric Coefficients

| Surface # | 2 | 3 | 4 | 5 |
|---|---|---|---|---|
| k = | −3.7679E+00 | −9.9000E+01 | 9.6641E+01 | 4.0139E+01 |
| A4 = | 5.0619E−02 | −3.4795E−01 | −5.0473E−01 | 4.3208E−01 |
| A6 = | −1.6181E−01 | −4.6311E−01 | −2.1581E+00 | −2.0743E+00 |
| A8 = | −9.7127E−01 | −3.5344E−02 | 6.3710E−02 | 2.4912E+00 |
| A10 = | 1.9990E+00 | −1.5447E+00 | 8.1077E+00 | 2.7257E−01 |
| A12 = | −2.7498E+00 | −1.0859E+00 | −5.4262E+00 | −2.0945E+00 |

TABLE 4-continued

| Aspheric Coefficients | | | |
|---|---|---|---|
| A14 = | −9.2065E+00 | 6.5882E+00 | 1.4374E+00 | −6.0272E−01 |
| A16 = | −3.1304E+01 | −1.9469E+01 | −2.2371E+01 | 1.3406E+00 |

| Surface # | 6 | 7 | 8 | 9 |
|---|---|---|---|---|
| k = | −1.5119E+00 | −2.4578E+00 | −6.2815E+00 | −6.1748E+00 |
| A4 = | 1.0202E+00 | −1.3828E−01 | −6.6545E−02 | −1.3431E−01 |
| A6 = | −8.1271E−01 | −2.3734E−01 | −6.2511E−01 | −1.8944E−02 |
| A8 = | −1.4221E+00 | 5.6236E−01 | 1.0998E+00 | 1.0353E−01 |
| A10 = | 3.7074E+00 | −6.9823E−02 | −9.4934E−01 | −9.6857E−02 |
| A12 = | −2.2322E+00 | 1.4101E−01 | 3.6509E−01 | 4.1356E−02 |
| A14 = | −5.3362E−01 | 4.9978E−02 | −3.4899E−02 | −8.4827E−03 |
| A16 = | 7.6537E−01 | 6.4567E−02 | −4.8966E−03 | 6.4688E−04 |

In the image capturing lens system according to the 2nd embodiment, the definitions of these parameters shown in the following table are the same as those stated in the 1st embodiment with corresponding values for the 2nd embodiment.

| 2nd Embodiment | | | |
|---|---|---|---|
| f [mm] | 2.07 | f3/f2 | 0.07 |
| Fno | 2.20 | T12/CT2 | 1.13 |
| HFOV [deg.] | 39.5 | (T12 + CT2 + T23)/CT1 | 1.45 |
| V2 | 23.4 | T34/CT4 | 0.47 |
| f/f1 | 0.78 | |(R3 − R4)/(R3 + R4)| | 0.28 |
| f/f2 | 0.10 | (R1 + R2)/(R1 − R2) | −0.96 |
| f2/f1 | 7.49 | (R7 + R8)/(R7 − R8) | 1.62 |

3rd Embodiment

Figure 5:
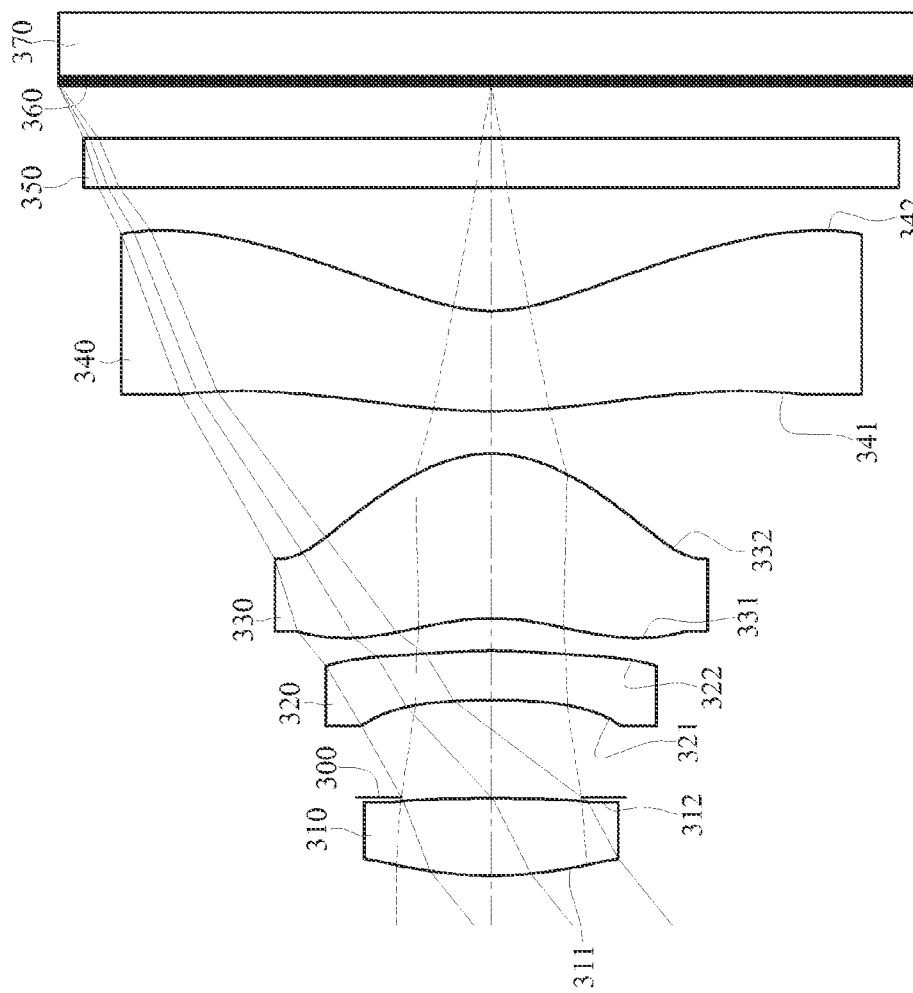
FIG. 5 is a schematic view of an image capturing device according to the 3rd embodiment of the present disclosure.
Figure 6:
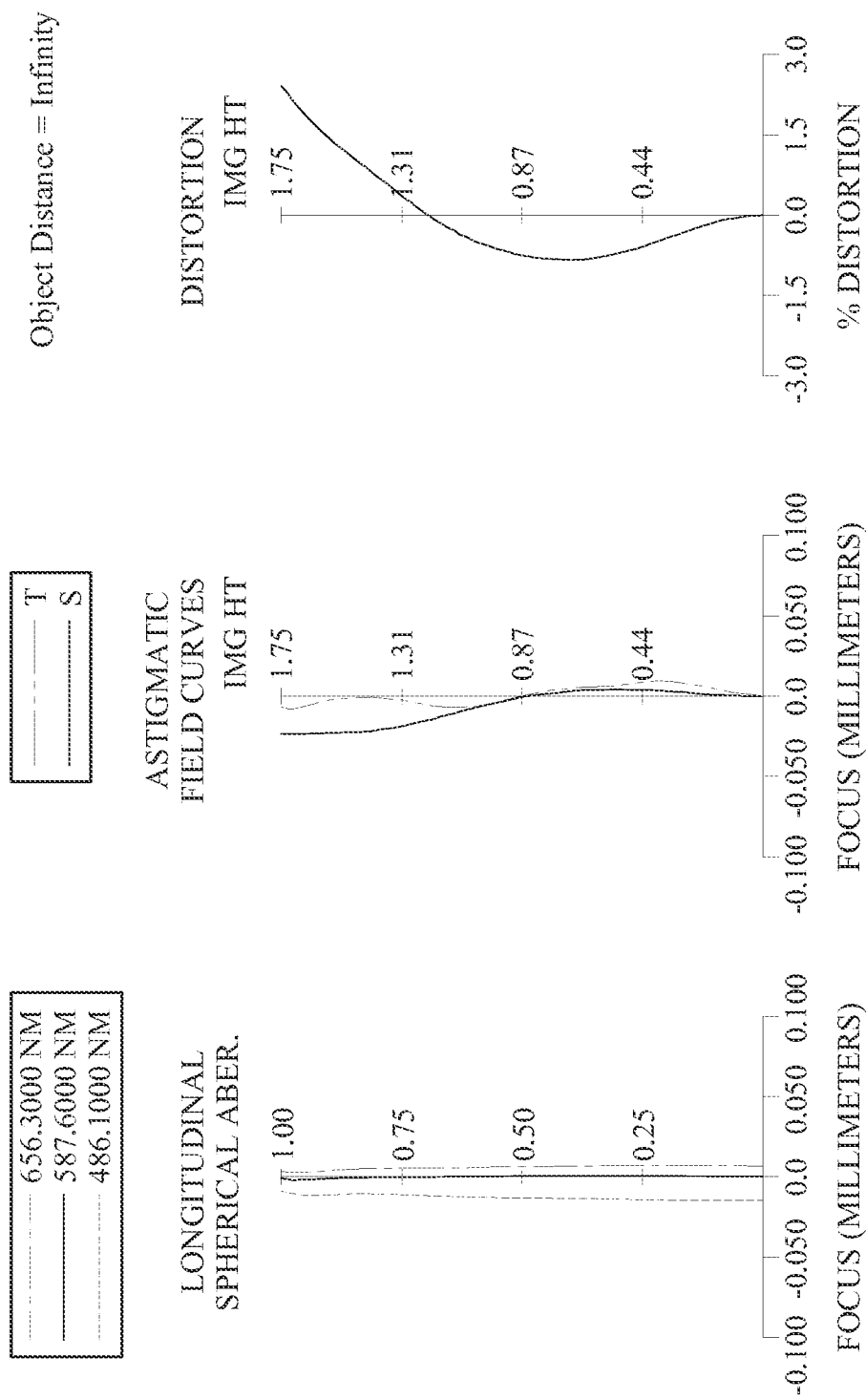
FIG. 6 shows spherical aberration curves, astigmatic field curves and a distortion curve of the image capturing lens system according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing lens system according to the 3rd embodiment. In FIG. 5, an image capturing device includes, in order from an object side to an image side, an image capturing lens system and an image sensor 370, the image capturing lens system includes, in order from an object side to an image side, a first lens element 310, an aperture stop 300, a second lens element 320, a third lens element 330, a fourth lens element 340, an IR-cut filter 350 and an image plane 360, wherein the image sensor 370 is located on the image plane 360 of the image capturing lens system, and the image capturing lens system has a total of four lens elements (310-340) with refractive power.

The first lens element 310 with positive refractive power has a convex object-side surface 311 in a paraxial region thereof and a convex image-side surface 312 in a paraxial region thereof. The first lens element 310 is made of plastic material and the object-side surface 311 and the image-side surface 312 thereof are aspheric.

The second lens element 320 with positive refractive power has a concave object-side surface 321 in a paraxial region thereof and a convex image-side surface 322 in a paraxial region thereof. The second lens element 320 is made of plastic material and the object-side surface 321 and the image-side surface 322 thereof are aspheric.

The third lens element 330 with positive refractive power has a concave object-side surface 331 in a paraxial region thereof and a convex image-side surface 332 in a paraxial region thereof. The third lens element 330 is made of plastic material and the object-side surface 331 and the image-side surface 332 thereof are aspheric. Moreover, both of the object-side surface 331 and the image-side surface 332 of the third lens element 330 have at least one inflection point.

The fourth lens element 340 with negative refractive power has a convex object-side surface 341 in a paraxial region thereof and a concave image-side surface 342 in a paraxial region thereof. The fourth lens element 340 is made of plastic material and the object-side surface 341 and the image-side surface 342 thereof are aspheric. Moreover, the image-side surface 342 of the fourth lens element 340 has at least one inflection point.

The IR-cut filter 350 is made of glass material, wherein the IR-cut filter 350 is located between the fourth lens element 340 and the image plane 360, and will not affect the focal length of the image capturing lens system.

The detailed optical data of the 3rd embodiment are shown in Table 5 and the aspheric surface data are shown in Table 6 below.

TABLE 5

3rd Embodiment
f = 2.12 mm, Fno = 2.75, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.607 | ASP | 0.313 | Plastic | 1.514 | 56.8 | 2.75 |
| 2 | | −10.873 | ASP | 0.006 | | | | |
| 3 | Ape. Stop | Plano | | 0.393 | | | | |
| 4 | Lens 2 | −2.410 | ASP | 0.199 | Plastic | 1.639 | 23.5 | 42.39 |
| 5 | | −2.284 | ASP | 0.132 | | | | |
| 6 | Lens 3 | −0.917 | ASP | 0.668 | Plastic | 1.535 | 55.7 | 1.36 |
| 7 | | −0.509 | ASP | 0.171 | | | | |
| 8 | Lens 4 | 2.560 | ASP | 0.406 | Plastic | 1.639 | 23.5 | −1.39 |
| 9 | | 0.619 | ASP | 0.500 | | | | |

TABLE 5-continued

3rd Embodiment
f = 2.12 mm, Fno = 2.75, HFOV = 38.9 deg.

| Surface # | | Curvature Radius | Thickness | Material | Index | Abbe # | Focal Length |
|---|---|---|---|---|---|---|---|
| 10 | IR-cut filter | Plano | 0.200 | Glass | 1.517 | 64.2 | — |
| 11 | | Plano | 0.211 | | | | |
| 12 | Image | Plano | — | | | | |

Note:
Reference wavelength is 587.6 nm (d-line).

TABLE 6

Aspheric Coefficients

| Surface # | 1 | 2 | 4 | 5 |
|---|---|---|---|---|
| k = | −4.7581E+00 | −5.5473E+01 | −5.5802E+01 | −4.5373E+01 |
| A4 = | 2.8874E−02 | −2.0885E−01 | −3.7352E−01 | 6.0680E−01 |
| A6 = | −2.5243E−01 | −8.4872E−01 | −2.6271E+00 | −2.2842E+00 |
| A8 = | −1.2773E+00 | 2.5367E+00 | 1.9594E+00 | 2.3233E+00 |
| A10 = | 3.1596E+00 | 1.1121E+00 | 1.1250E+01 | 1.9292E−01 |
| A12 = | −5.1331E+00 | 4.6315E+00 | −2.7588E+01 | −1.8469E+00 |
| A14 = | −4.5347E+01 | −1.1957E+03 | −3.3809E+01 | 5.1542E−01 |
| A16 = | 1.2417E+02 | 5.5104E+03 | 1.6487E+02 | −2.9473E−01 |

| Surface # | 6 | 7 | 8 | 9 |
|---|---|---|---|---|
| k = | −2.1204E+00 | −2.2446E+00 | −9.9178E+00 | −5.7104E+00 |
| A4 = | 9.7085E−01 | −8.8459E−02 | −6.9377E−02 | −9.1860E−02 |
| A6 = | −6.4954E−01 | −1.0689E+00 | −7.6667E−02 | 2.9146E−02 |
| A8 = | 7.3817E−01 | 5.9149E+00 | 1.3918E−01 | 1.0254E−02 |
| A10 = | −4.8028E+00 | −1.6489E+01 | −7.4212E−02 | −1.6478E−02 |
| A12 = | 1.2065E+01 | 2.6949E+01 | −7.1893E−03 | 5.5370E−03 |
| A14 = | −1.2390E+01 | −2.1121E+01 | 2.0924E−02 | −3.3228E−04 |
| A16 = | 4.4660E+00 | 6.0480E+00 | −5.6002E−03 | −9.5803E−05 |

In the image capturing lens system according to the 3rd embodiment, the definitions of these parameters shown in the following table are the same as those stated in the 1st embodiment with corresponding values for the 3rd embodiment.

| 3rd Embodiment | | | |
|---|---|---|---|
| f [mm] | 2.12 | f3/f2 | 0.03 |
| Fno | 2.75 | T12/CT2 | 2.01 |
| HFOV [deg.] | 38.9 | (T12 + CT2 + T23)/CT1 | 2.33 |
| V2 | 23.5 | T34/CT4 | 0.42 |
| f/f1 | 0.77 | |(R3 − R4)/(R3 + R4)| | 0.03 |
| f/f2 | 0.05 | (R1 + R2)/(R1 − R2) | −0.74 |
| f2/f1 | 15.41 | (R7 + R8)/(R7 − R8) | 1.64 |

4th Embodiment

Figure 7:
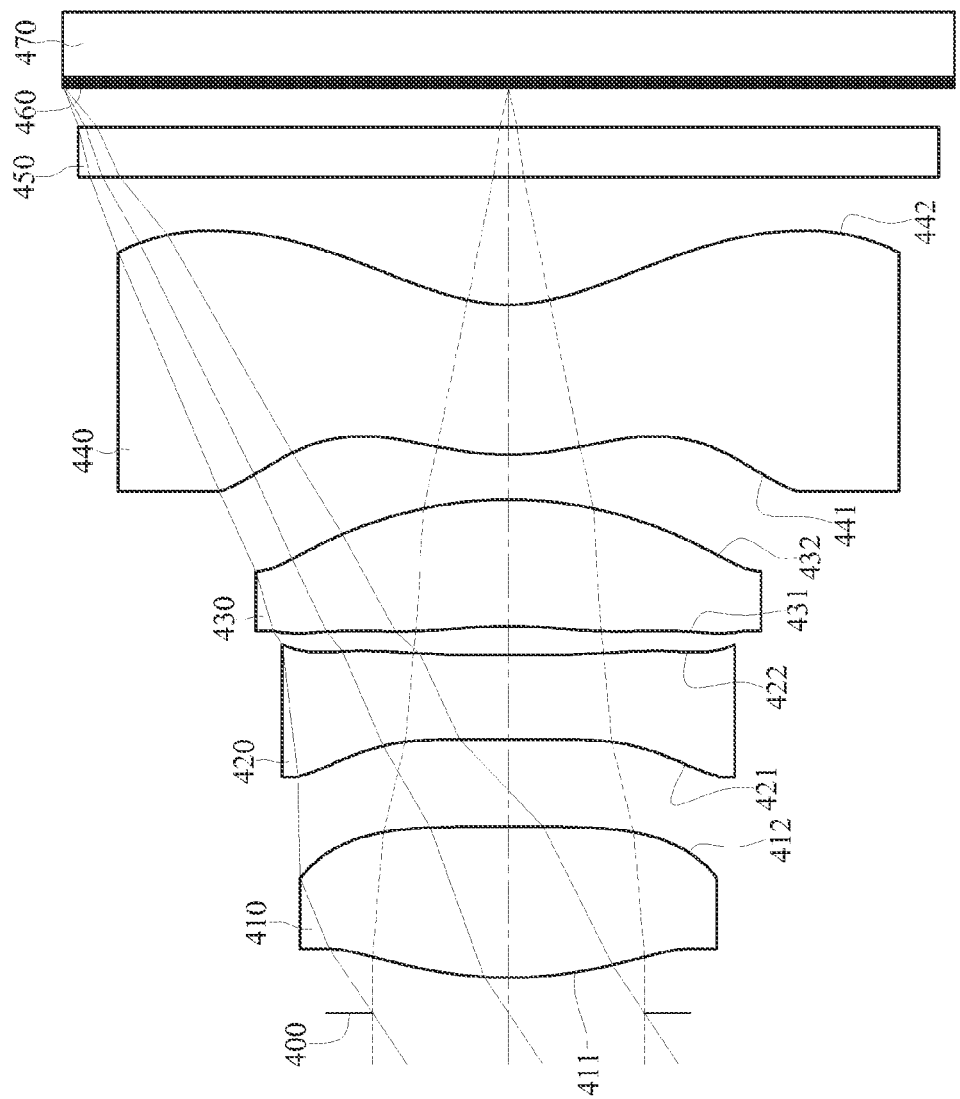
FIG. 7 is a schematic view of an image capturing device according to the 4th embodiment of the present disclosure.
Figure 8:
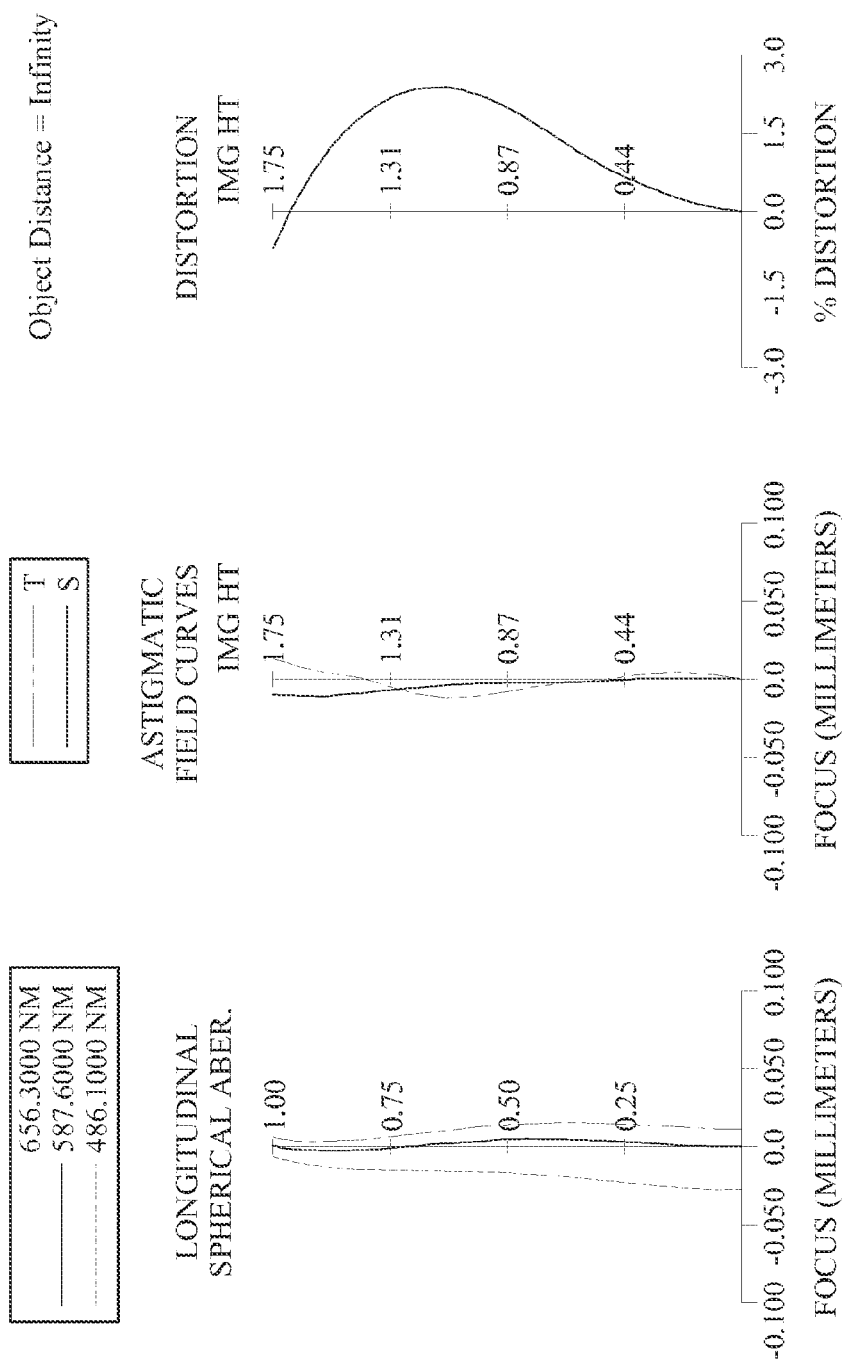
FIG. 8 shows spherical aberration curves, astigmatic field curves and a distortion curve of the image capturing lens system according to the 4th embodiment.

FIG. 7 is a schematic view of an image capturing device according to the 4th embodiment of the present disclosure. FIG. 8 shows spherical aberration curves, astigmatic field curves and a distortion curve of the image capturing lens system according to the 4th embodiment. In FIG. 7, an image capturing device includes, in order from an object side to an image side, an image capturing lens system and an image sensor 470, the image capturing lens system includes, in order from an object side to an image side, an aperture stop 400, a first lens element 410, a second lens element 420, a third lens element 430, a fourth lens element 440, an IR-cut filter 450 and an image plane 460, wherein the image sensor 470 is located on the image plane 460 of the image capturing lens system, and the image capturing lens system has a total of four lens elements (410-440) with refractive power.

The first lens element 410 with positive refractive power has a convex object-side surface 411 in a paraxial region thereof and a convex image-side surface 412 in a paraxial region thereof. The first lens element 410 is made of plastic material and the object-side surface 411 and the image-side surface 412 thereof are aspheric.

The second lens element 420 with positive refractive power has a convex object-side surface 421 in a paraxial region thereof and a convex image-side surface 422 in a paraxial region thereof. The second lens element 420 is made of plastic material and the object-side surface 421 and the image-side surface 422 thereof are aspheric.

The third lens element 430 with positive refractive power has a concave object-side surface 431 in a paraxial region thereof and a convex image-side surface 432 in a paraxial region thereof. The third lens element 430 is made of plastic material and the object-side surface 431 and the image-side surface 432 thereof are aspheric. Moreover, both of the object-side surface 431 and the image-side surface 432 of the third lens element 430 have at least one inflection point.

The fourth lens element 440 with negative refractive power has a convex object-side surface 441 in a paraxial region thereof and a concave image-side surface 442 in a paraxial region thereof. The fourth lens element 440 is made of plastic material and the object-side surface 441 and the image-side surface 442 thereof are aspheric. Moreover, the image-side surface 442 of the fourth lens element 440 has at least one inflection point.

The IR-cut filter 450 is made of glass material, wherein the IR-cut filter 450 is located between the fourth lens element 440 and the image plane 460, and will not affect the focal length of the image capturing lens system.

The detailed optical data of the 4th embodiment are shown in Table 7 and the aspheric surface data are shown in Table 8 below.

TABLE 7

4th Embodiment
f = 2.62 mm, Fno = 2.45, HFOV = 33.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.139 | | | | |
| 2 | Lens 1 | 1.579 | ASP | 0.594 | Plastic | 1.535 | 55.7 | 2.91 |
| 3 | | −87.225 | ASP | 0.345 | | | | |
| 4 | Lens 2 | 48.682 | ASP | 0.332 | Plastic | 1.650 | 21.4 | 52.53 |
| 5 | | −113.842 | ASP | 0.114 | | | | |
| 6 | Lens 3 | −1.573 | ASP | 0.497 | Plastic | 1.535 | 55.7 | 43.84 |
| 7 | | −1.637 | ASP | 0.177 | | | | |
| 8 | Lens 4 | 1.042 | ASP | 0.591 | Plastic | 1.491 | 58.0 | −12.31 |
| 9 | | 0.723 | ASP | 0.500 | | | | |
| 10 | IR-cut filter | Plano | | 0.200 | Glass | 1.517 | 64.2 | — |
| 11 | | Plano | | 0.154 | | | | |
| 12 | Image | Plano | | — | | | | |

Note:
Reference wavelength is 587.6 nm (d-line).

TABLE 8

Aspheric Coefficients

| Surface # | 2 | 3 | 4 | 5 |
|---|---|---|---|---|
| k = | −4.1647E+00 | 9.9000E+01 | −9.9000E+01 | −9.9000E+01 |
| A4 = | 4.4400E−02 | −2.7784E−01 | −3.5431E−01 | 7.0012E−01 |
| A6 = | −1.0557E−01 | −2.6018E−01 | −6.1304E−01 | −2.3718E+00 |
| A8 = | −4.7000E−01 | 1.3380E−01 | −1.0798E+00 | 2.1403E+00 |
| A10 = | 1.0160E+00 | 2.4150E−02 | 7.4137E+00 | 4.4418E−01 |
| A12 = | −1.5809E+00 | −3.9197E−01 | −7.1238E+00 | −7.6258E−01 |
| A14 = | −2.3208E−01 | 7.3838E−01 | −9.5857E−01 | −1.7961E−02 |
| A16 = | −2.8356E−01 | −8.7603E−01 | 2.7269E+00 | −3.1854E−02 |

| Surface # | 6 | 7 | 8 | 9 |
|---|---|---|---|---|
| k = | −2.2148E+01 | −6.5327E−01 | −7.5498E+00 | −1.7858E+00 |
| A4 = | 1.0446E+00 | −2.3760E−02 | −2.5758E+00 | −5.5751E−01 |
| A6 = | −2.3913E+00 | −8.2415E−02 | −9.1405E−01 | 5.6409E−01 |
| A8 = | 2.8173E+00 | 2.5864E−01 | 2.2069E+00 | −4.1300E−01 |
| A10 = | −4.4574E+00 | 3.1756E−01 | −2.8255E+00 | 2.0421E−01 |
| A12 = | 7.1897E+00 | −1.9282E+00 | 2.2195E+00 | −6.4744E−02 |
| A14 = | −5.6183E+00 | 2.3350E+00 | −9.2349E−01 | 1.1761E−02 |
| A16 = | 1.5749E+00 | −8.4385E−01 | 1.5351E−01 | −9.3059E−04 |

In the image capturing lens system according to the 4th embodiment, the definitions of these parameters shown in the following table are the same as those stated in the 1st embodiment with corresponding values for the 4th embodiment.

| 4th Embodiment | | | |
|---|---|---|---|
| f [mm] | 2.62 | f3/f2 | 0.83 |
| Fno | 2.45 | T12/CT2 | 1.04 |
| HFOV [deg.] | 33.9 | (T12 + CT2 + T23)/CT1 | 1.33 |
| V2 | 21.4 | T34/CT4 | 0.30 |
| f/f1 | 0.90 | |(R3 − R4)/(R3 + R4)| | 2.49 |
| f/f2 | 0.05 | (R1 + R2)/(R1 − R2) | −0.96 |
| f2/f1 | 18.05 | (R7 + R8)/(R7 − R8) | 5.53 |

5th Embodiment

Figure 9:
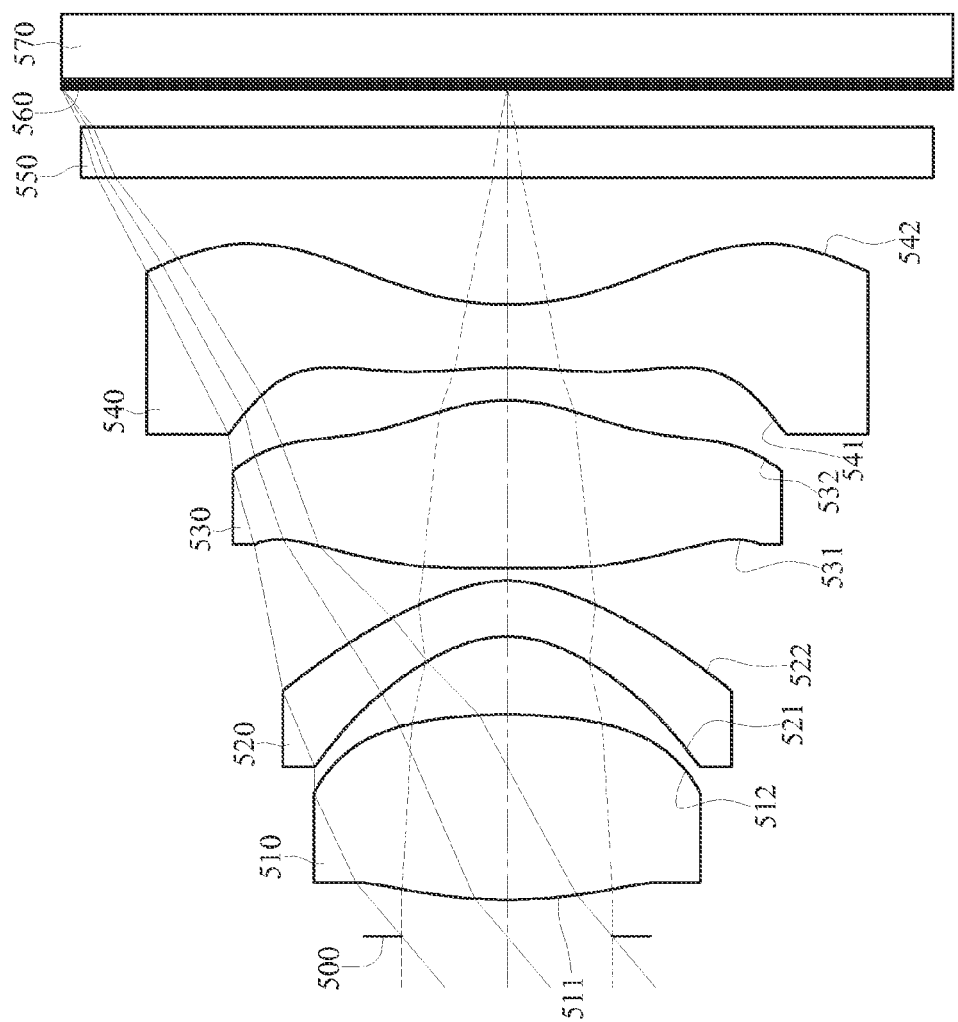
FIG. 9 is a schematic view of an image capturing device according to the 5th embodiment of the present disclosure.
Figure 10:
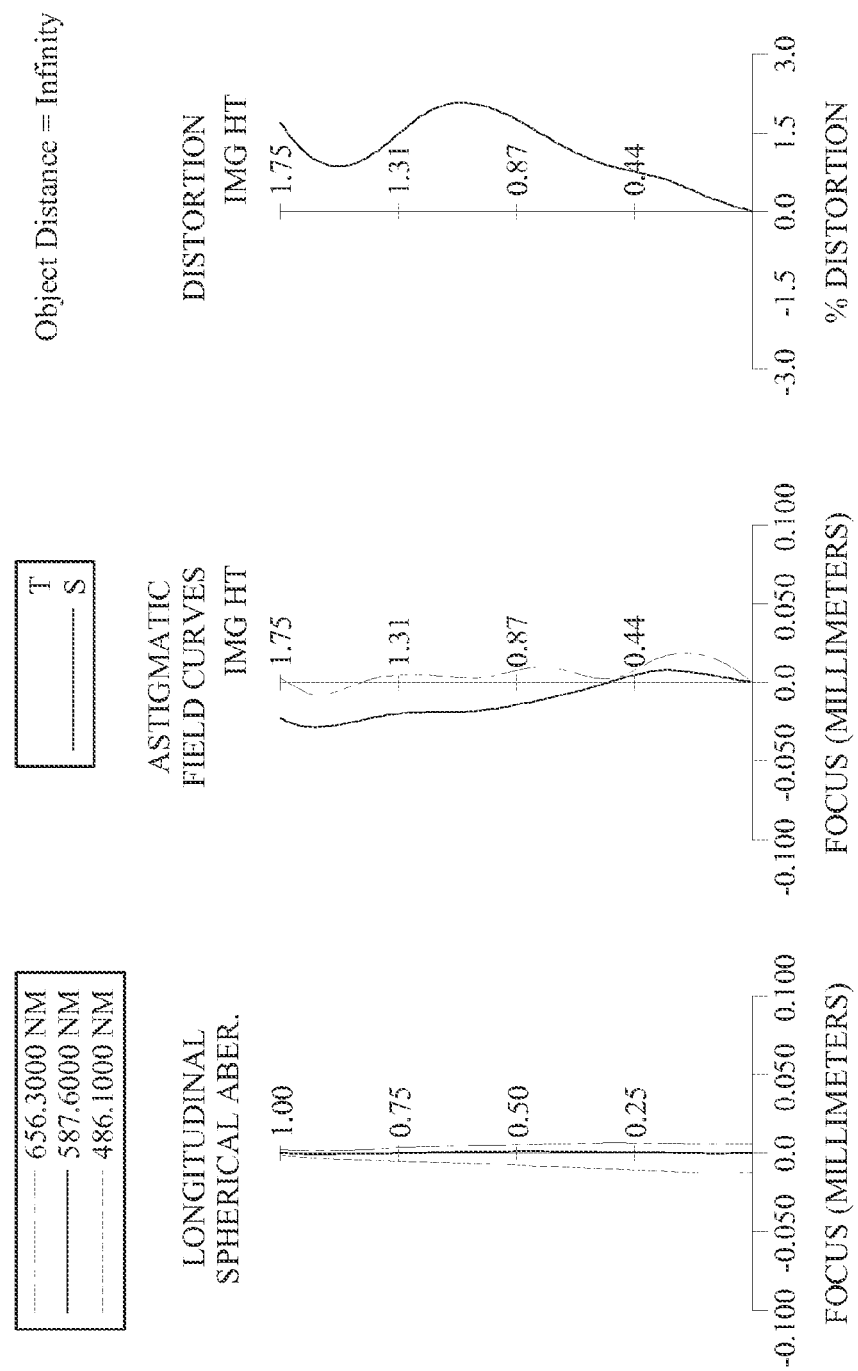
FIG. 10 shows spherical aberration curves, astigmatic field curves and a distortion curve of the image capturing lens system according to the 5th embodiment.

FIG. 9 is a schematic view of an image capturing device according to the 5th embodiment of the present disclosure. FIG. 10 shows spherical aberration curves, astigmatic field curves and a distortion curve of the image capturing lens system according to the 5th embodiment. In FIG. 9, an image capturing device includes, in order from an object side to an image side, an image capturing lens system and an image sensor 570, the image capturing lens system includes, in order from an object side to an image side, an aperture stop 500, a first lens element 510, a second lens element 520, a third lens element 530, a fourth lens element 540, an IR-cut filter 550 and an image plane 560, wherein the image sensor 570 is located on the image plane 560 of the image capturing lens system, and the image capturing lens system has a total of four lens elements (510-540) with refractive power.

The first lens element 510 with positive refractive power has a convex object-side surface 511 in a paraxial region thereof and a convex image-side surface 512 in a paraxial region thereof. The first lens element 510 is made of plastic material and the object-side surface 511 and the image-side surface 512 thereof are aspheric.

The second lens element 520 with positive refractive power has a concave object-side surface 521 in a paraxial region thereof and a convex image-side surface 522 in a paraxial region thereof. The second lens element 520 is made of plastic material and the object-side surface 521 and the image-side surface 522 thereof are aspheric.

The third lens element 530 with positive refractive power has a convex object-side surface 531 in a paraxial region thereof and a convex image-side surface 532 in a paraxial region thereof. The third lens element 530 is made of plastic material and the object-side surface 531 and the image-side surface 532 thereof are aspheric. Moreover, both of the object-side surface 531 and the image-side surface 532 of the third lens element 530 have at least one inflection point.

The fourth lens element 540 with negative refractive power has a concave object-side surface 541 in a paraxial region thereof and a concave image-side surface 542 in a paraxial region thereof. The fourth lens element 540 is made of plastic material and the object-side surface 541 and the image-side surface 542 thereof are aspheric. Moreover, the image-side surface 542 of the fourth lens element 540 has at least one inflection point.

The IR-cut filter 550 is made of glass material, wherein the IR-cut filter 550 is located between the fourth lens element 540 and the image plane 560, and will not affect the focal length of the image capturing lens system.

The detailed optical data of the 5th embodiment are shown in Table 9 and the aspheric surface data are shown in Table 10 below.

TABLE 9

5th Embodiment
f = 2.03 mm, Fno = 2.45, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.147 | | | | |
| 2 | Lens 1 | 1.953 | ASP | 0.730 | Plastic | 1.514 | 56.8 | 2.18 |
| 3 | | −2.295 | ASP | 0.309 | | | | |
| 4 | Lens 2 | −0.463 | ASP | 0.219 | Plastic | 1.639 | 23.5 | 27.32 |
| 5 | | −0.534 | ASP | 0.050 | | | | |
| 6 | Lens 3 | 100.000 | ASP | 0.663 | Plastic | 1.535 | 55.7 | 1.30 |
| 7 | | −0.701 | ASP | 0.129 | | | | |
| 8 | Lens 4 | −1.748 | ASP | 0.250 | Plastic | 1.639 | 23.5 | −1.08 |
| 9 | | 1.198 | ASP | 0.500 | | | | |
| 10 | IR-cut filter | Plano | | 0.200 | Glass | 1.517 | 64.2 | — |
| 11 | | Plano | | 0.149 | | | | |
| 12 | Image | Plano | | — | | | | |

Note:
Reference wavelength is 587.6 nm (d-line).

TABLE 10

Aspheric Coefficients

| Surface # | 2 | 3 | 4 | 5 |
|---|---|---|---|---|
| k = | −7.1229E+00 | 6.7015E+00 | −1.8529E+00 | −2.0679E+00 |
| A4 = | 2.3260E−02 | −1.3349E−01 | 4.4275E−02 | 8.2073E−01 |
| A6 = | −4.1825E−02 | −1.7520E−01 | −3.1466E−01 | −2.2808E+00 |
| A8 = | −1.0872E+00 | −2.9626E−02 | −1.8184E+00 | 2.2103E+00 |
| A10 = | 1.3030E+00 | −9.5521E−01 | 6.1054E+00 | 2.5297E−01 |
| A12 = | 3.0086E+00 | −8.4179E−01 | −7.9656E+00 | −1.2107E+00 |
| A14 = | −1.5222E+01 | 2.9528E+00 | 5.9807E−01 | −3.7540E−01 |
| A16 = | −3.1123E−01 | −1.1756E+00 | 5.2618E+00 | 6.3727E−01 |

| Surface # | 6 | 7 | 8 | 9 |
|---|---|---|---|---|
| k = | −2.7975E+01 | −3.3468E+00 | −9.8833E+00 | −5.0799E−01 |
| A4 = | 7.8629E−01 | 3.1592E−01 | 1.4817E+00 | 1.1961E−01 |

TABLE 10-continued

Aspheric Coefficients

| A6 = | −1.9165E+00 | 1.3736E+00 | −3.5905E+00 | −9.7951E−01 |
|---|---|---|---|---|
| A8 = | 3.8898E+00 | −3.8762E+00 | 4.6336E+00 | 1.2321E+00 |
| A10 = | −6.6294E+00 | 3.6345E+00 | −4.0402E+00 | −9.0578E−01 |
| A12 = | 7.4159E+00 | −1.0688E+00 | 1.8520E+00 | 3.9754E−01 |
| A14 = | −4.6871E+00 | −4.7080E−01 | −2.3855E−01 | −9.4972E−02 |
| A16 = | 1.2280E+00 | 2.8690E−01 | −4.5854E−02 | 9.3962E−03 |

In the image capturing lens system according to the 5th embodiment, the definitions of these parameters shown in the following table are the same as those stated in the 1st embodiment with corresponding values for the 5th embodiment.

5th Embodiment

| f [mm] | 2.03 | f3/f2 | 0.05 |
|---|---|---|---|
| Fno | 2.45 | T12/CT2 | 1.41 |
| HFOV [deg.] | 40.3 | (T12 + CT2 + T23)/CT1 | 0.79 |
| V2 | 23.5 | T34/CT4 | 0.52 |
| f/f1 | 0.93 | \|(R3 − R4)/(R3 + R4)\| | 0.07 |
| f/f2 | 0.07 | (R1 + R2)/(R1 − R2) | −0.08 |
| f2/f1 | 12.53 | (R7 + R8)/(R7 − R8) | 0.19 |

6th Embodiment

Figure 11:
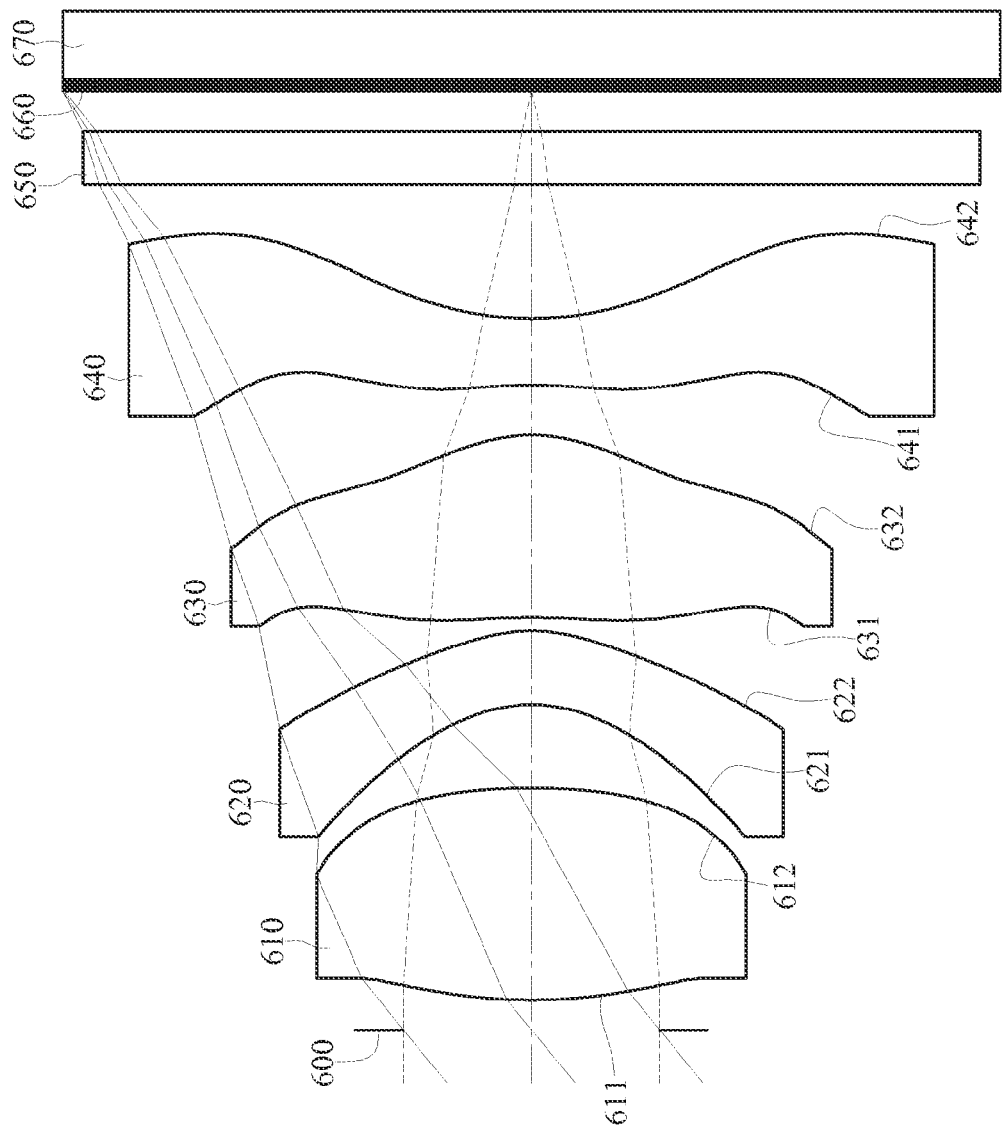
FIG. 11 is a schematic view of an image capturing device according to the 6th embodiment of the present disclosure.
Figure 12:
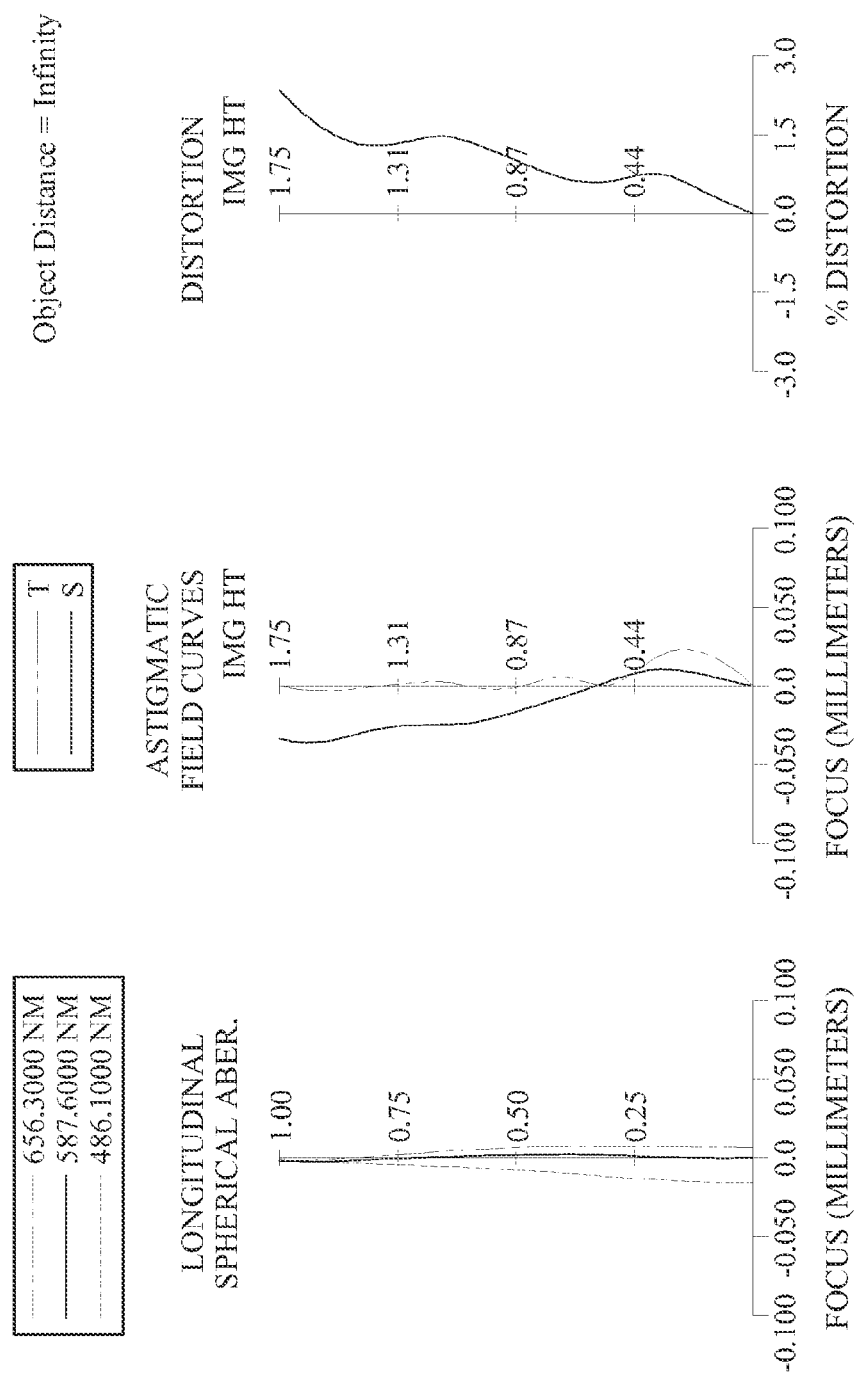
FIG. 12 shows spherical aberration curves, astigmatic field curves and a distortion curve of the image capturing lens system according to the 6th embodiment.

FIG. 11 is a schematic view of an image capturing device according to the 6th embodiment of the present disclosure. FIG. 12 shows spherical aberration curves, astigmatic field curves and a distortion curve of the image capturing lens system according to the 6th embodiment. In FIG. 11, an image capturing device includes, in order from an object side to an image side, an image capturing lens system and an image sensor 670, the image capturing lens system includes, in order from an object side to an image side, an aperture stop 600, a first lens element 610, a second lens element 620, a third lens element 630, a fourth lens element 640, an IR-cut filter 650 and an image plane 660, wherein the image sensor 670 is located on the image plane 660 of the image capturing lens system, and the image capturing lens system has a total of four lens elements (610-640) with refractive power.

The first lens element 610 with positive refractive power has a convex object-side surface 611 in a paraxial region thereof and a convex image-side surface 612 in a paraxial region thereof. The first lens element 610 is made of plastic material and the object-side surface 611 and the image-side surface 612 thereof are aspheric.

The second lens element 620 with positive refractive power has a concave object-side surface 621 in a paraxial region thereof and a convex image-side surface 622 in a paraxial region thereof. The second lens element 620 is made of plastic material and the object-side surface 621 and the image-side surface 622 thereof are aspheric.

The third lens element 630 with positive refractive power has a concave object-side surface 631 in a paraxial region thereof and a convex image-side surface 632 in a paraxial region thereof. The third lens element 630 is made of plastic material and the object-side surface 631 and the image-side surface 632 thereof are aspheric. Moreover, both of the object-side surface 631 and the image-side surface 632 of the third lens element 630 have at least one inflection point.

The fourth lens element 640 with negative refractive power has a concave object-side surface 641 in a paraxial region thereof and a concave image-side surface 642 in a paraxial region thereof. The fourth lens element 640 is made of plastic material and the object-side surface 641 and the image-side surface 642 thereof are aspheric. Moreover, the image-side surface 642 of the fourth lens element 640 has at least one inflection point.

The IR-cut filter 650 is made of glass material, wherein the IR-cut filter 650 is located between the fourth lens element 640 and the image plane 660, and will not affect the focal length of the image capturing lens system.

The detailed optical data of the 6th embodiment are shown in Table 11 and the aspheric surface data are shown in Table 12 below.

TABLE 11

6th Embodiment
f = 2.10 mm, Fno = 2.20, HFOV = 39.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.111 | | | | |
| 2 | Lens 1 | 1.920 ASP | 0.794 | Plastic | 1.514 | 56.8 | 2.15 |
| 3 | | −2.239 ASP | 0.311 | | | | |
| 4 | Lens 2 | −0.559 ASP | 0.276 | Plastic | 1.639 | 23.5 | 7.82 |
| 5 | | −0.599 ASP | 0.050 | | | | |
| 6 | Lens 3 | −2.000 ASP | 0.683 | Plastic | 1.535 | 55.7 | 1.34 |
| 7 | | −0.591 ASP | 0.186 | | | | |
| 8 | Lens 4 | −1.669 ASP | 0.250 | Plastic | 1.639 | 23.5 | −1.10 |
| 9 | | 1.278 ASP | 0.500 | | | | |
| 10 | IR-cut filter | Plano | 0.200 | Glass | 1.517 | 64.2 | |
| 11 | | Plano | 0.151 | | | | |
| 12 | Image | Plano | — | | | | |

Note:
Reference wavelength is 587.6 nm (d-line).

TABLE 12

Aspheric Coefficients

| Surface # | 2 | 3 | 4 | 5 |
|---|---|---|---|---|
| k = | −5.8227E+00 | 4.8390E+00 | −1.4234E+00 | −3.1562E+00 |
| A4 = | 2.7932E−02 | −1.7059E−01 | 9.9890E−02 | 8.2149E−01 |
| A6 = | −2.4028E−02 | −1.1092E−01 | −1.2248E−01 | −2.3047E+00 |
| A8 = | −8.2340E−01 | 1.5690E−01 | −1.6176E+00 | 2.2030E+00 |
| A10 = | 9.7429E−01 | −7.5909E−01 | 6.2628E+00 | 2.6451E−01 |
| A12 = | 2.2840E+00 | −5.5187E−01 | −7.9910E+00 | −1.1796E+00 |
| A14 = | −8.3076E+00 | 3.1038E+00 | 1.9248E−01 | −3.4317E−01 |
| A16 = | −3.1123E−01 | −2.5943E+00 | 4.1815E+00 | 5.9502E−01 |

| Surface # | 6 | 7 | 8 | 9 |
|---|---|---|---|---|
| k = | −2.7975E+01 | −2.9341E+00 | −9.8833E+00 | −1.7507E+00 |
| A4 = | 1.3593E+00 | 1.4993E−01 | 1.6481E+00 | 2.5995E−01 |
| A6 = | −3.7996E+00 | 1.2121E+00 | −3.8893E+00 | −6.9828E−01 |
| A8 = | 7.5456E+00 | −2.4073E+00 | 5.6239E+00 | 6.1237E−01 |
| A10 = | −1.1550E+01 | 9.4540E−01 | −5.6845E+00 | −3.1900E−01 |
| A12 = | 1.1823E+01 | 1.1908E+00 | 3.5408E+00 | 1.0533E−01 |
| A14 = | −7.1848E+00 | −1.3573E+00 | −1.1795E+00 | −2.0069E−02 |
| A16 = | 1.9175E+00 | 4.1158E−01 | 1.6014E−01 | 1.6508E−03 |

In the image capturing lens system according to the 6th embodiment, the definitions of these parameters shown in the following table are the same as those stated in the 1st embodiment with corresponding values for the 6th embodiment.

| 6th Embodiment | | | |
|---|---|---|---|
| f [mm] | 2.10 | f3/f2 | 0.17 |
| Fno | 2.20 | T12/CT2 | 1.13 |
| HFOV [deg.] | 39.1 | (T12 + CT2 + T23)/CT1 | 0.80 |
| V2 | 23.5 | T34/CT4 | 0.74 |
| f/f1 | 0.98 | |(R3 − R4)/(R3 + R4)| | 0.04 |
| f/f2 | 0.27 | (R1 + R2)/(R1 − R2) | −0.08 |
| f2/f1 | 3.64 | (R7 + R8)/(R7 − R8) | 0.13 |

7th Embodiment

Figure 13:
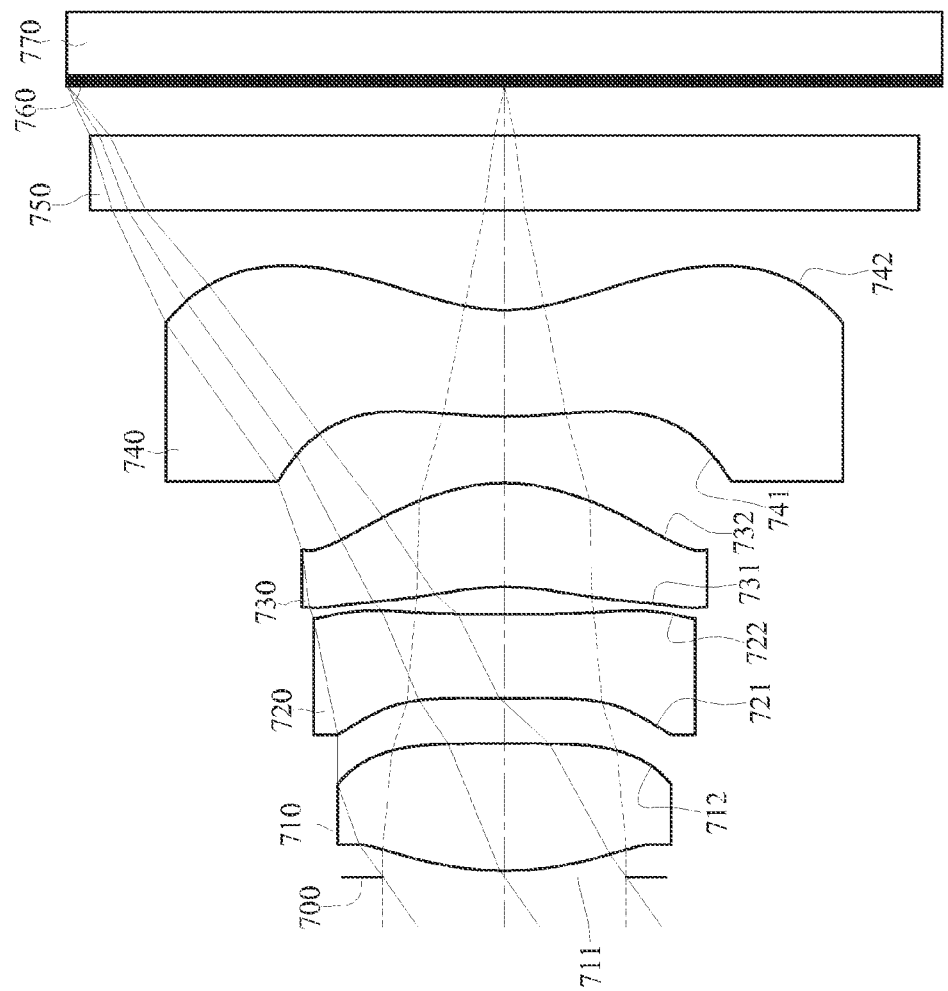
FIG. 13 is a schematic view of an image capturing device according to the 7th embodiment of the present disclosure.
Figure 14:
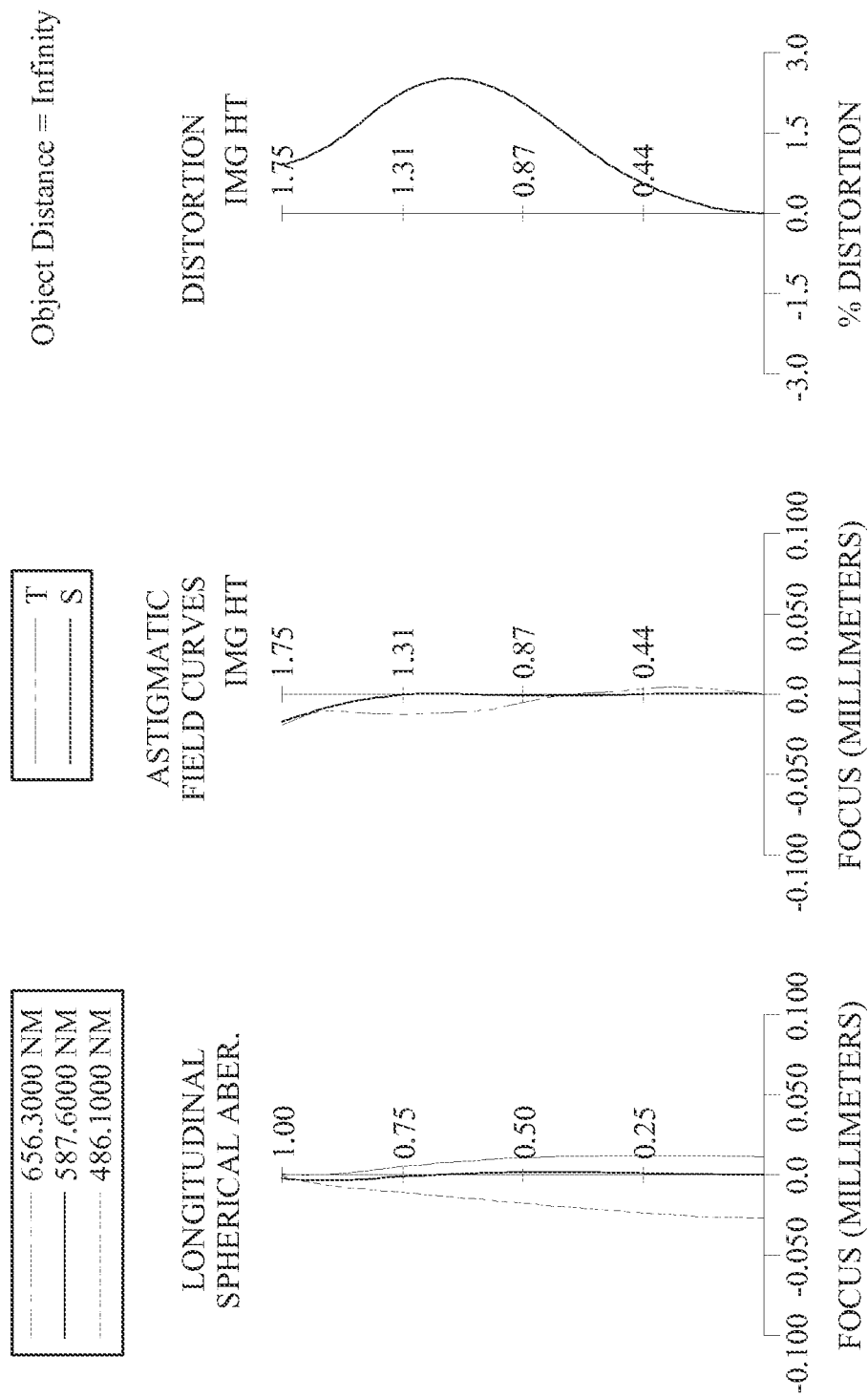
FIG. 14 shows spherical aberration curves, astigmatic field curves and a distortion curve of the image capturing lens system according to the 7th embodiment.

FIG. 13 is a schematic view of an image capturing device according to the 7th embodiment of the present disclosure. FIG. 14 shows spherical aberration curves, astigmatic field curves and a distortion curve of the image capturing lens system according to the 7th embodiment. In FIG. 13, an image capturing device includes, in order from an object side to an image side, an image capturing lens system and an image sensor 770, the image capturing lens system includes, in order from an object side to an image side, an aperture stop 700, a first lens element 710, a second lens element 720, a third lens element 730, a fourth lens element 740, an IR-cut filter 750 and an image plane 760, wherein the image sensor 770 is located on the image plane 760 of the image capturing lens system, and the image capturing lens system has a total of four lens elements (710-740) with refractive power.

The first lens element 710 with positive refractive power has a convex object-side surface 711 in a paraxial region thereof and a convex image-side surface 712 in a paraxial region thereof. The first lens element 710 is made of plastic material and the object-side surface 711 and the image-side surface 712 thereof are aspheric.

The second lens element 720 with positive refractive power has a convex object-side surface 721 in a paraxial region thereof and a concave image-side surface 722 in a paraxial region thereof. The second lens element 720 is made of plastic material and the object-side surface 721 and the image-side surface 722 thereof are aspheric.

The third lens element 730 with positive refractive power has a concave object-side surface 731 in a paraxial region thereof and a convex image-side surface 732 in a paraxial region thereof. The third lens element 730 is made of plastic material and the object-side surface 731 and the image-side surface 732 thereof are aspheric. Moreover, both of the object-side surface 731 and the image-side surface 732 of the third lens element 730 have at least one inflection point.

The fourth lens element 740 with negative refractive power has a convex object-side surface 741 in a paraxial region thereof and a concave image-side surface 742 in a paraxial region thereof. The fourth lens element 740 is made of plastic material and the object-side surface 741 and the image-side surface 742 thereof are aspheric. Moreover, the image-side surface 742 of the fourth lens element 740 has at least one inflection point.

The IR-cut filter 750 is made of glass material, wherein the IR-cut filter 750 is located between the fourth lens element 740 and the image plane 760, and will not affect the focal length of the image capturing lens system.

The detailed optical data of the 7th embodiment are shown in Table 13 and the aspheric surface data are shown in Table 14 below.

TABLE 13

7th Embodiment
f = 2.44 mm, Fno = 2.50, HFOV = 35.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.025 | | | | |
| 2 | Lens 1 | 1.302 ASP | 0.511 | Plastic | 1.514 | 56.8 | 2.47 |

TABLE 13-continued

7th Embodiment
f = 2.44 mm, Fno = 2.50, HFOV = 35.4 deg.

| Surface # | | Curvature Radius | | Thickness | Material | Index | Abbe # | Focal Length |
|---|---|---|---|---|---|---|---|---|
| 3 | | −42.582 | ASP | 0.182 | | | | |
| 4 | Lens 2 | 28.501 | ASP | 0.337 | Plastic | 1.650 | 21.4 | 113.15 |
| 5 | | 46.331 | ASP | 0.110 | | | | |
| 6 | Lens 3 | −0.980 | ASP | 0.417 | Plastic | 1.535 | 55.7 | 3.40 |
| 7 | | −0.731 | ASP | 0.267 | | | | |
| 8 | Lens 4 | 2.238 | ASP | 0.427 | Plastic | 1.544 | 55.9 | −2.28 |
| 9 | | 0.744 | ASP | 0.400 | | | | |
| 10 | IR-cut filter | Plano | | 0.300 | Glass | 1.517 | 64.2 | |
| 11 | | Plano | | 0.199 | | | | |
| 12 | Image | Plano | | — | | | | |

Note:
Reference wavelength is 587.6 nm (d-line).

TABLE 14

Aspheric Coefficients

| Surface # | 2 | 3 | 4 | 5 |
|---|---|---|---|---|
| k = | −2.8708E+00 | −4.2497E+01 | 9.9000E+01 | 8.8429E+01 |
| A4 = | 6.9074E−02 | −5.2482E−01 | −6.0627E−01 | 6.3280E−01 |
| A6 = | −1.7368E−01 | −5.4540E−01 | −1.5947E+00 | −2.3620E+00 |
| A8 = | −1.0236E+00 | −1.4903E−01 | −1.6581E−01 | 2.3883E+00 |
| A10 = | 2.1488E+00 | 7.0246E−02 | 9.3486E+00 | −2.9360E−01 |
| A12 = | −1.8372E+00 | 1.3268E+00 | −5.2256E+00 | −2.0048E+00 |
| A14 = | −2.3113E+01 | 2.1984E+00 | 5.4668E−02 | 1.2060E−01 |
| A16 = | 2.1824E+01 | −1.1351E+01 | −6.4694E+00 | 3.6269E+00 |

| Surface # | 6 | 7 | 8 | 9 |
|---|---|---|---|---|
| k = | −7.1804E+00 | −3.3189E+00 | −1.7188E+01 | −4.3482E+00 |
| A4 = | 9.7930E−01 | −3.8452E−02 | −3.9767E−01 | −3.1026E−01 |
| A6 = | −1.1744E+00 | −3.2346E−01 | −6.6065E−01 | 1.4933E−01 |
| A8 = | −1.7457E+00 | 5.1661E−01 | 1.2616E+00 | −2.4221E−03 |
| A10 = | 3.7606E+00 | 1.4152E−01 | −1.1099E+00 | −7.2878E−02 |
| A12 = | −1.6517E+00 | 4.7071E−01 | 2.5793E−01 | 4.5754E−02 |
| A14 = | 2.7611E−01 | 1.6668E−01 | 1.4934E−01 | −1.0880E−02 |
| A16 = | 6.8379E−01 | −5.2467E−01 | −1.2742E−01 | 6.3705E−04 |

In the image capturing lens system according to the 7th embodiment, the definitions of these parameters shown in the following table are the same as those stated in the 1st embodiment with corresponding values for the 7th embodiment.

| 7th Embodiment | | | |
|---|---|---|---|
| f [mm] | 2.44 | f3/f2 | 0.03 |
| Fno | 2.50 | T12/CT2 | 0.54 |
| HFOV [deg.] | 35.4 | (T12 + CT2 + T23)/CT1 | 1.23 |
| V2 | 21.4 | T34/CT4 | 0.63 |
| f/f1 | 0.99 | \|(R3 − R4)/(R3 + R4)\| | 0.24 |
| f/f2 | 0.02 | (R1 + R2)/(R1 − R2) | −0.94 |
| f2/f1 | 45.81 | (R7 + R8)/(R7 − R8) | 2.00 |

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising, in order from an object side to an image side:
    a first lens element with positive refractive power having a convex object-side surface in a paraxial region thereof and a convex image-side surface in a paraxial region thereof;
    a second lens element having positive refractive power;
    a third lens element having positive refractive power; and
    a fourth lens element with negative refractive power having a concave image-side surface in a paraxial region thereof, wherein both of an object-side surface and the image-side surface of the fourth lens element are aspheric;
    wherein the image capturing lens system has a total of four lens elements with refractive power, a focal length of the first lens element is f1, a focal length of the second lens element is f2, a focal length of the third lens element is f3, a central thickness of the first lens element is CT1, a central thickness of the second lens element is CT2, an axial distance between the first lens element and the second lens element is T12, an axial distance between the second lens element and the third lens element is T23, and the following relationships are satisfied:

$0 < f2/f1;$ $0 < f3/f2 < 1.25;$ $0.3 < (T12+CT2+T23)/CT1 < 1.9;$ and $0.88 \leq T12/CT2 < 2.5.$ 2. The image capturing lens system of claim 1, wherein the focal length of the second lens element is f2, the focal length of the third lens element is f3, and the following relationship is satisfied:

$0 < f3/f2 < 0.8.$

3. The image capturing lens system of claim 2, wherein the focal length of the first lens element is f1, the focal length of the second lens element is f2, and the following relationship is satisfied:

$1.0 < f2/f1.$

4. The image capturing lens system of claim 2, wherein a curvature radius of an object-side surface of the second lens element is R3, a curvature radius of an image-side surface of the second lens element is R4, and the following relationship is satisfied:

$|(R3-R4)/(R3+R4)| < 1.25.$

5. The image capturing lens system of claim 2, wherein the second lens element has a convex image-side surface in a paraxial region thereof.

6. The image capturing lens system of claim 5, wherein a central thickness of the fourth lens element is CT4, an axial distance between the third lens element and the fourth lens element is T34, and the following relationship is satisfied:

$0.25 < T34/CT4 < 1.0.$

7. The image capturing lens system of claim 5, wherein the central thickness of the first lens element is CT1, the central thickness of the second lens element is CT2, the axial distance between the first lens element and the second lens element is T12, the axial distance between the second lens element and the third lens element is T23, and the following relationship is satisfied:

$0.5 < (T12+CT2+T23)/CT1 < 1.65.$

8. The image capturing lens system of claim 1, wherein a curvature radius of the object-side surface of the first lens element is R1, a curvature radius of the image-side surface of the first lens element is R2, and the following relationship is satisfied:

$-1.0 < (R1+R2)/(R1-R2) < 0.3.$

9. The image capturing lens system of claim 8, further comprising:
a stop disposed between an imaged object and the first lens element, wherein the first lens element, the second lens element, the third lens element and the fourth lens element are made of plastic material.

10. The image capturing lens system of claim 8, wherein a focal length of the image capturing lens system is f, the focal length of the first lens element is f1, and the following relationship is satisfied:

$0.6 < f/f1 < 1.2.$

11. The image capturing lens system of claim 8, wherein the third lens element has a concave object-side surface in a paraxial region thereof and a convex image-side surface in a paraxial region thereof.

12. The image capturing lens system of claim 11, wherein at least one of the object-side surface or the image-side surface of the third lens element has at least one inflection point.

13. The image capturing lens system of claim 11, wherein a focal length of the image capturing lens system is f, the focal length of the second lens element is f2, and the following relationship is satisfied:

$0 < f/f2 < 0.5.$

14. The image capturing lens system of claim 11, wherein an Abbe number of the second lens element is V2, and the following relationship is satisfied:

$V2 < 32.$

15. The image capturing lens system of claim 1, wherein the image-side surface of the fourth lens element has at least one inflection point.

16. The image capturing lens system of claim 15, wherein the second lens element has a concave object-side surface in a paraxial region thereof.

17. The image capturing lens system of claim 15, wherein a curvature radius of the object-side surface of the fourth lens element is R7, a curvature radius of the image-side surface of the fourth lens element is R8, and the following relationship is satisfied:

$0 < (R7+R8)/(R7-R8).$

18. The image capturing lens system of claim 15, wherein the object-side surface of the fourth lens element is convex in a paraxial region thereof.

19. An image capturing device comprising, in order from an object side to an image side:
the image capturing lens system of claim 1; and
an image sensor.

* * * * *